Figure 11:
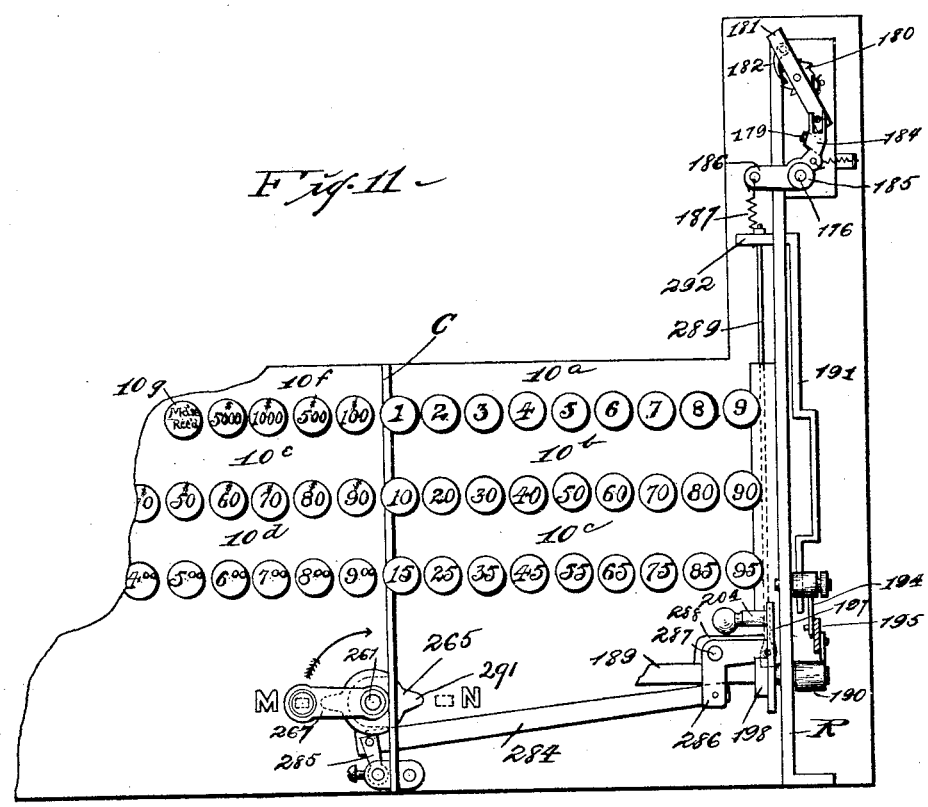

(No Model.) 14 Sheets—Sheet 1.
R. BAUMANN & T. H. WURMB.
COMBINED CASH REGISTER, INDICATOR, AND RECORDER.
No. 585,248. Patented June 29, 1897.
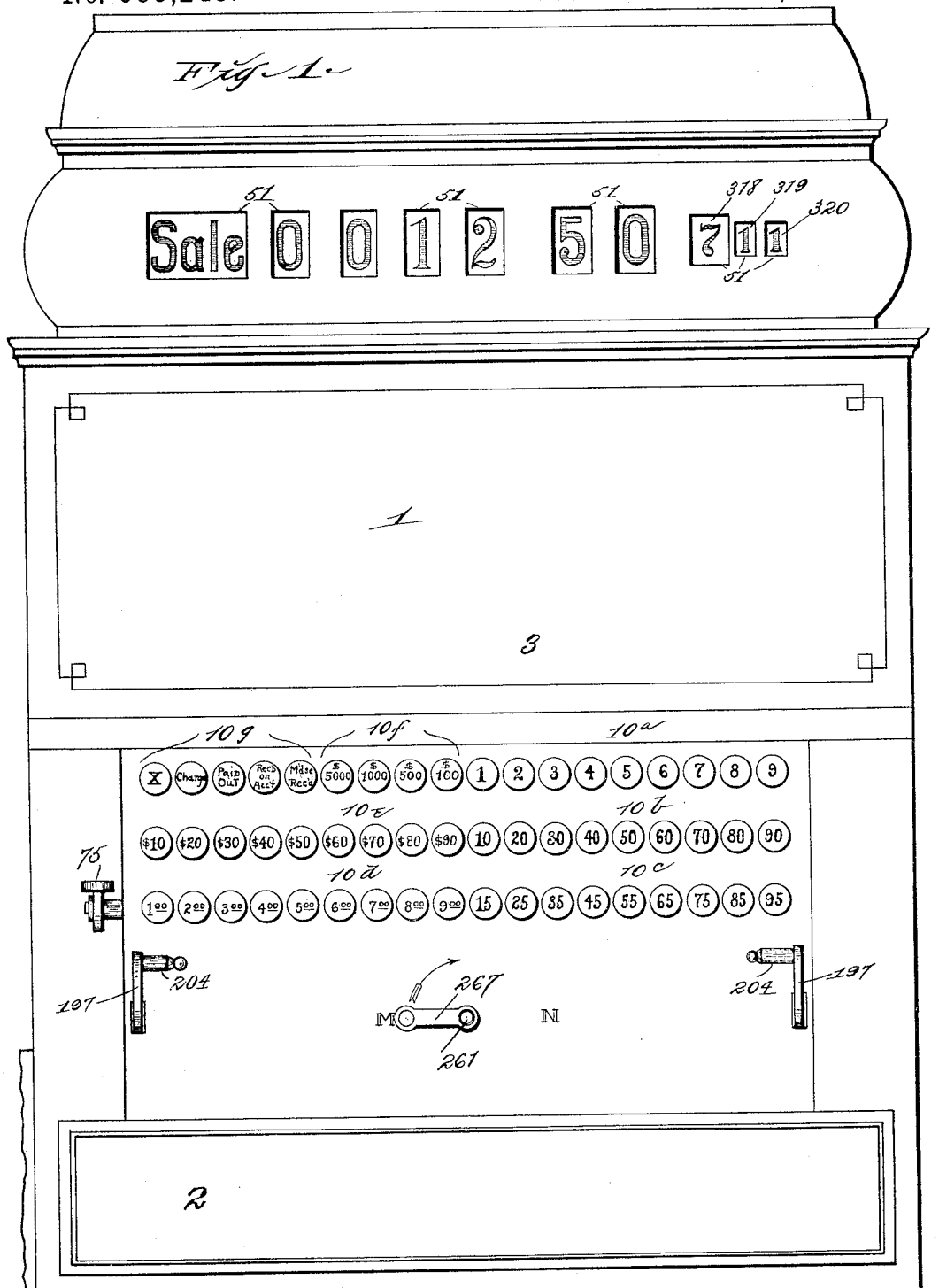

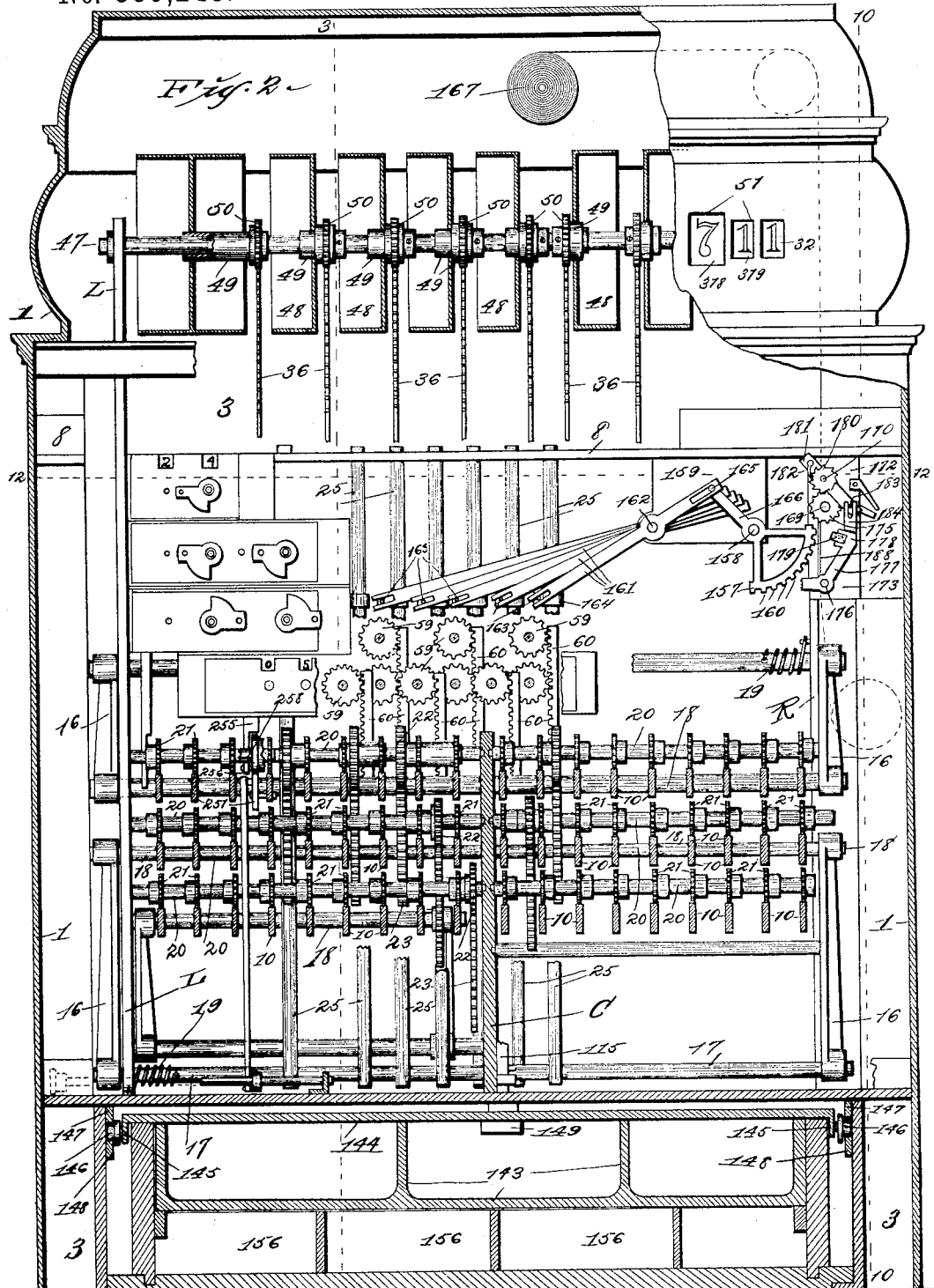

(No Model.) 14 Sheets—Sheet 3.
R. BAUMANN & T. H. WURMB.
COMBINED CASH REGISTER, INDICATOR, AND RECORDER.
No. 585,248. Patented June 29, 1897.
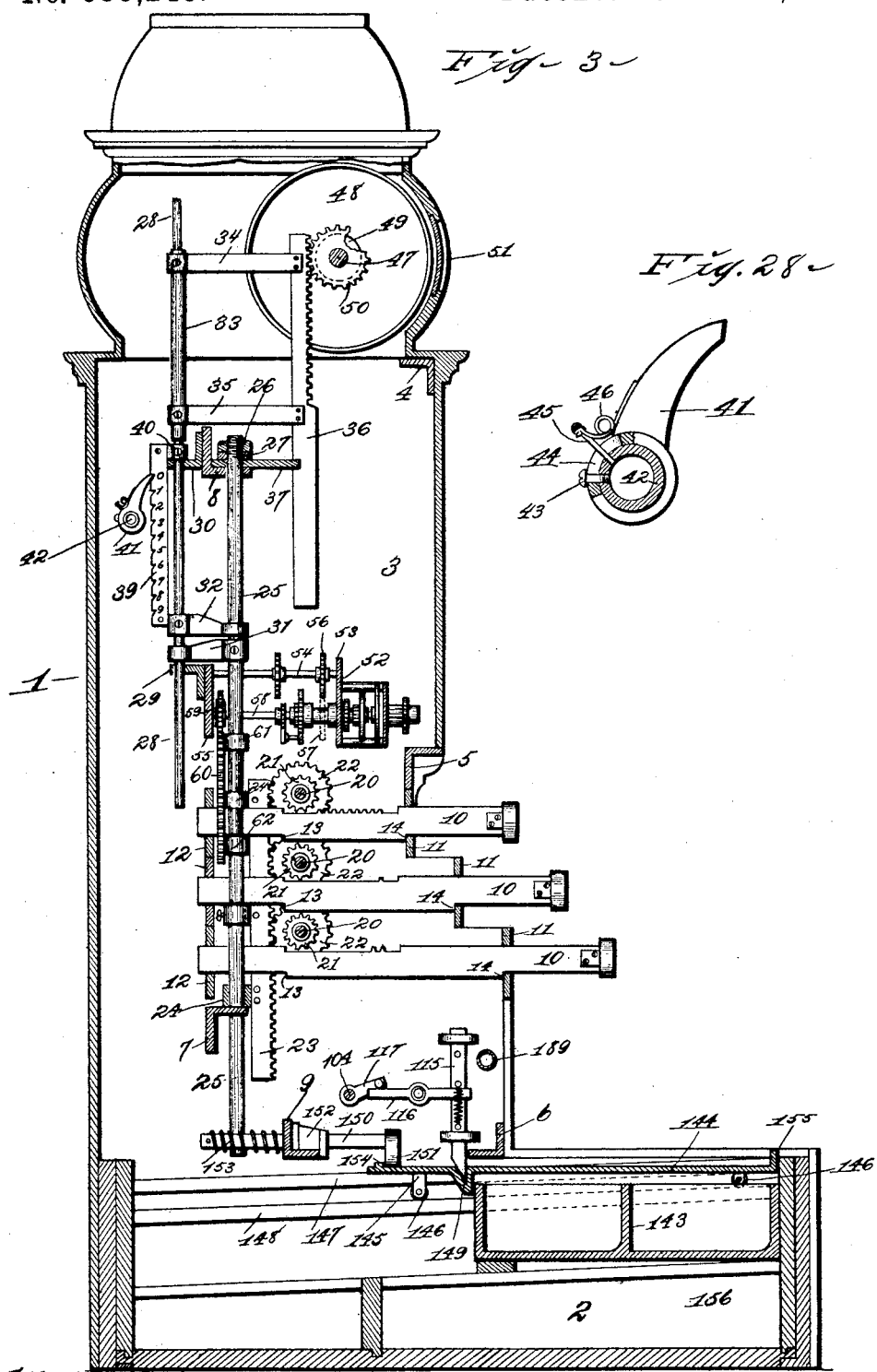

(No Model.) 14 Sheets—Sheet 4.
R. BAUMANN & T. H. WURMB.
COMBINED CASH REGISTER, INDICATOR, AND RECORDER.
No. 585,248. Patented June 29, 1897.
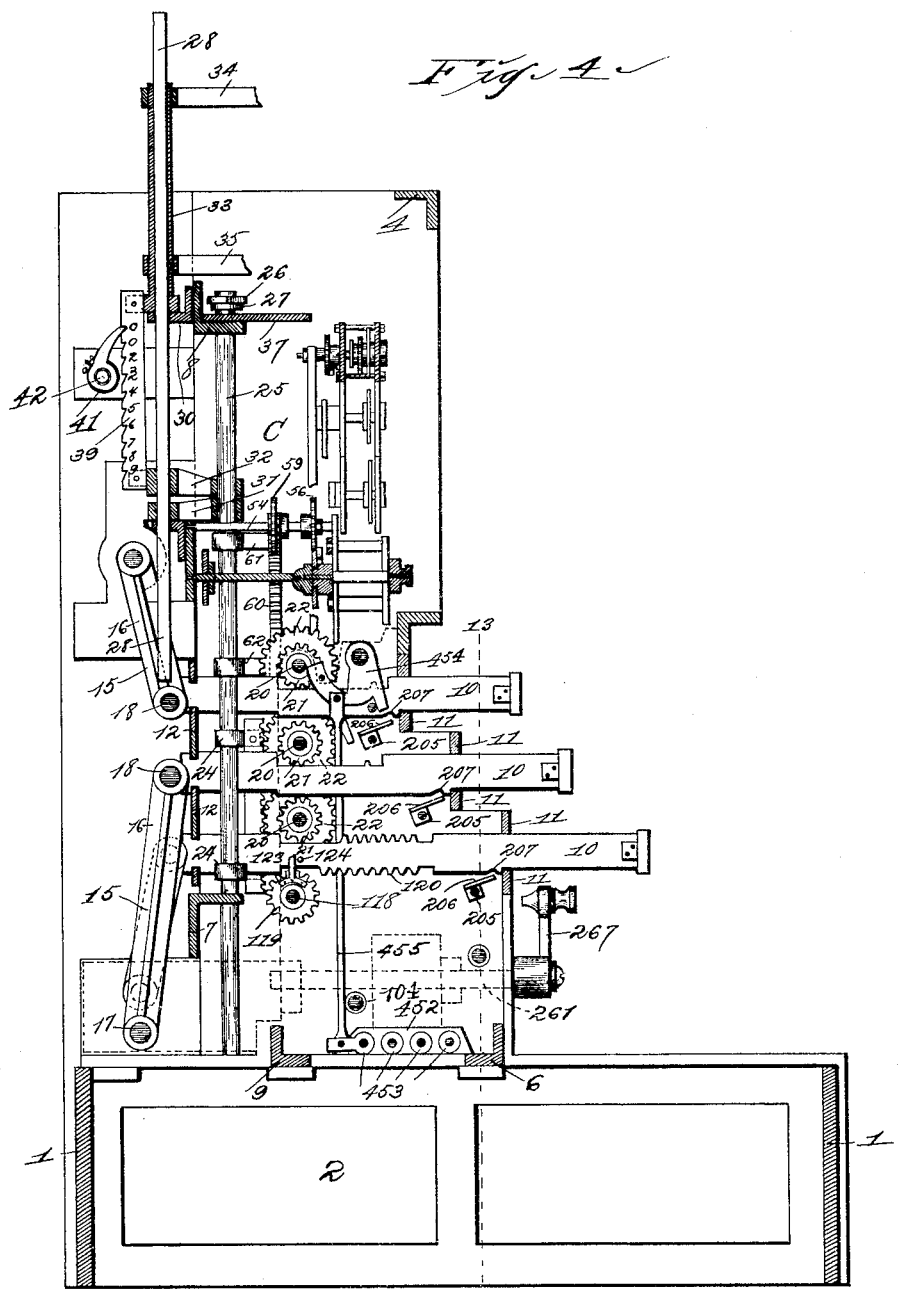

(No Model.) 14 Sheets—Sheet 5.
R. BAUMANN & T. H. WURMB.
COMBINED CASH REGISTER, INDICATOR, AND RECORDER.
No. 585,248. Patented June 29, 1897.
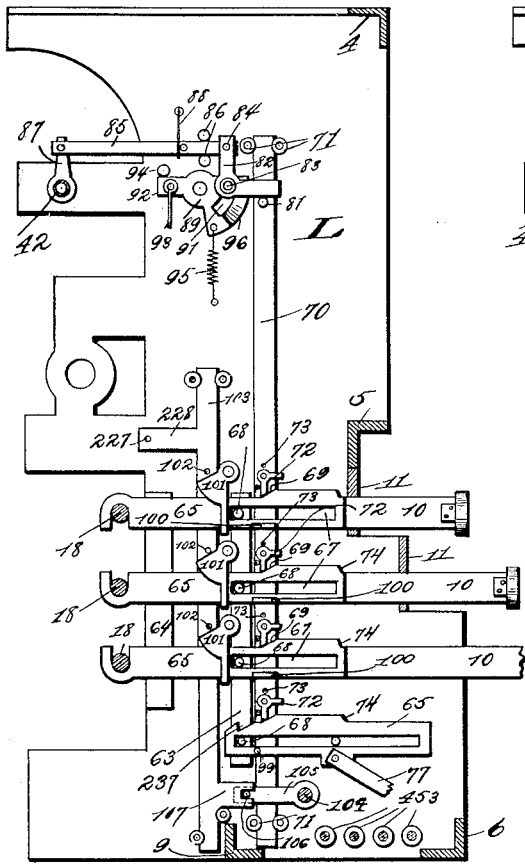
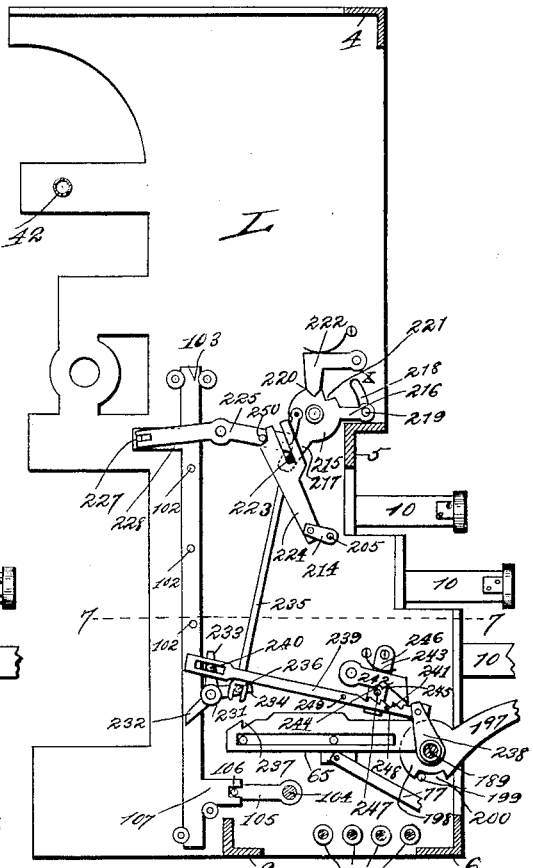
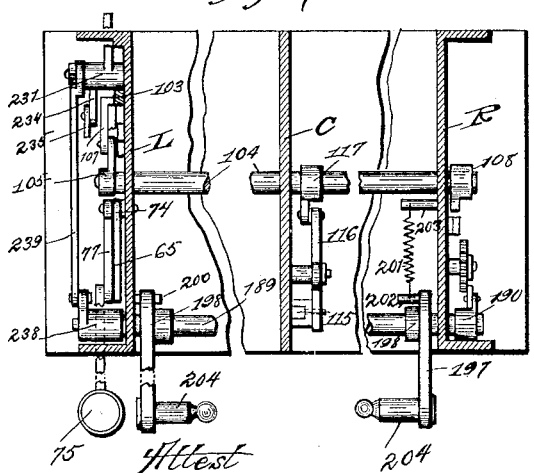
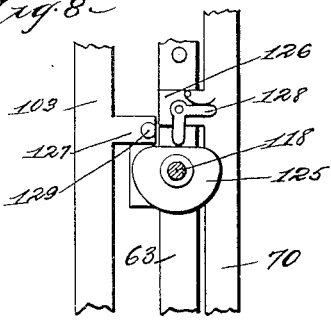
Inventors:
Robert Baumann and
Theodore H. Wurmb
by Higdon & Higdon & Longan
Attys (No Model.) 14 Sheets—Sheet 6.
R. BAUMANN & T. H. WURMB.
COMBINED CASH REGISTER, INDICATOR, AND RECORDER.
No. 585,248. Patented June 29, 1897.
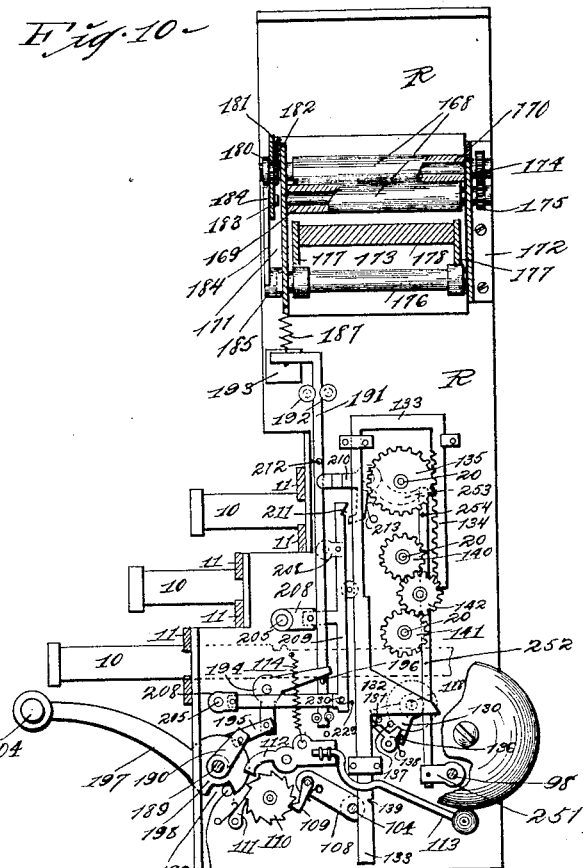
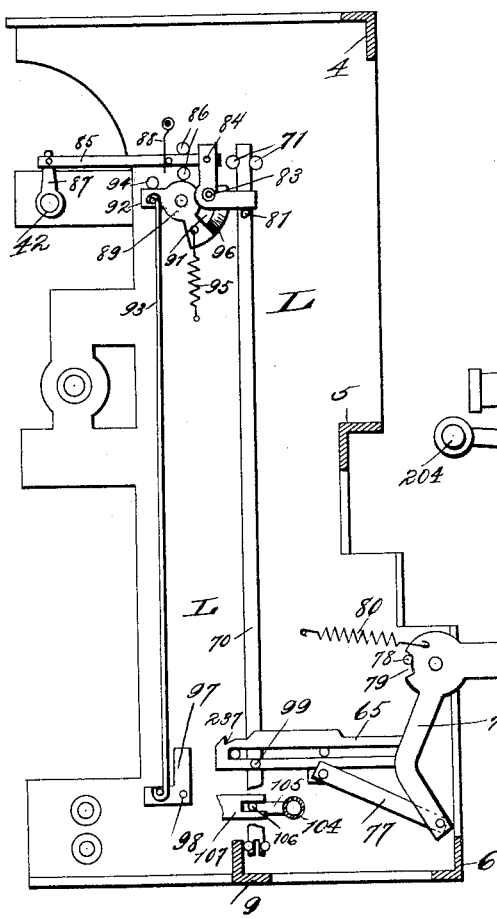

(No Model.) 14 Sheets—Sheet 7.

R. BAUMANN & T. H. WURMB.
COMBINED CASH REGISTER, INDICATOR, AND RECORDER.

No. 585,248. Patented June 29, 1897.

Attest:
A. A. Blankemeister
M. P. Smith

Inventors:
Robert Baumann and
Theodore H. Wurmb
by Higdon, Higdon & Longan
Attys.

(No Model.) 14 Sheets—Sheet 8.
R. BAUMANN & T. H. WURMB.
COMBINED CASH REGISTER, INDICATOR, AND RECORDER.
No. 585,248. Patented June 29, 1897.
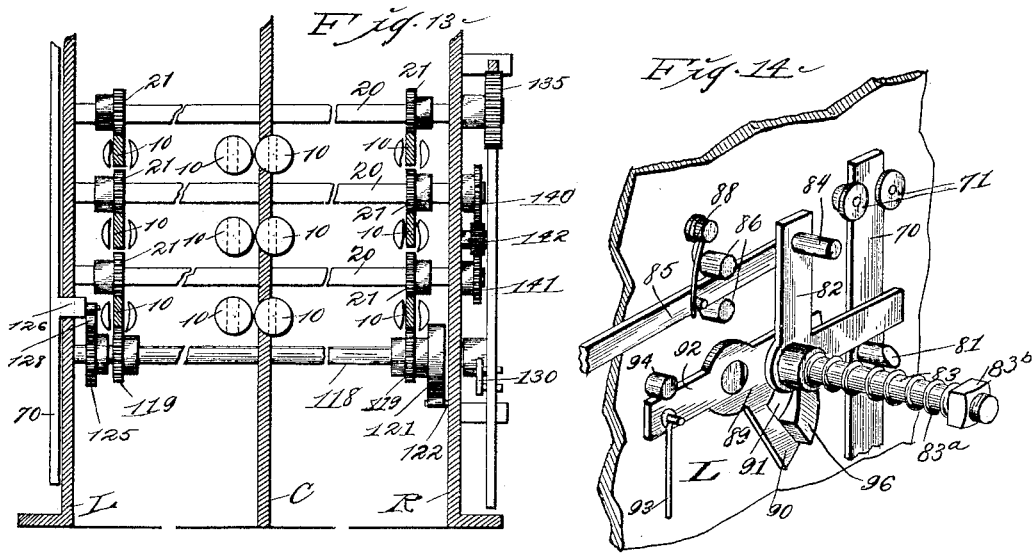
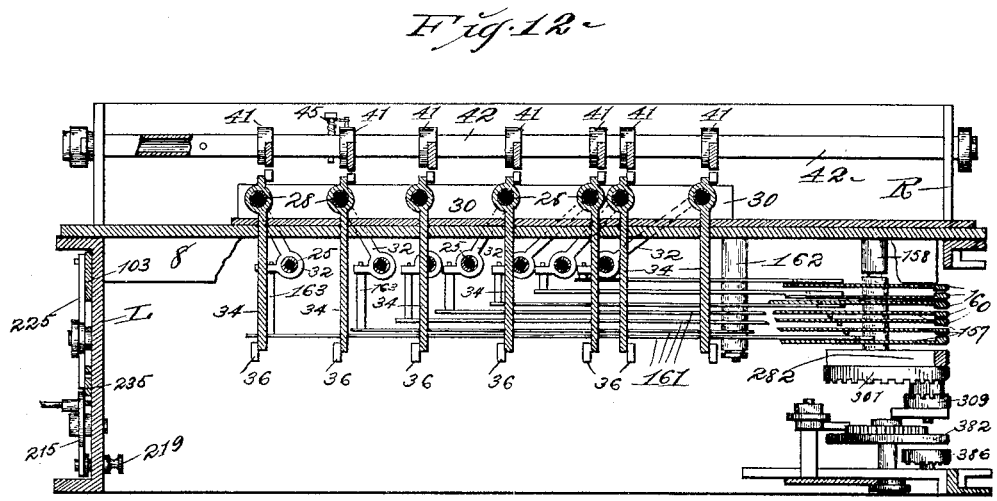
Attest:
A. A. Blankemeister,
M. P. Smith
Inventors:
Robert Baumann and
Theodore H. Wurmb
By Higdon & Higdon & Longan
Attys.

(No Model.) 14 Sheets—Sheet 9.

R. BAUMANN & T. H. WURMB.
COMBINED CASH REGISTER, INDICATOR, AND RECORDER.

No. 585,248. Patented June 29, 1897.

Attest:
A. A. Blaumeister
M. P. Smith

Inventors:
Robert Baumann and
Theodore H. Wurmb
by Higdon & Higdon & Longan Attys.

(No Model.) 14 Sheets—Sheet 10.
R. BAUMANN & T. H. WURMB.
COMBINED CASH REGISTER, INDICATOR, AND RECORDER.
No. 585,248. Patented June 29, 1897.
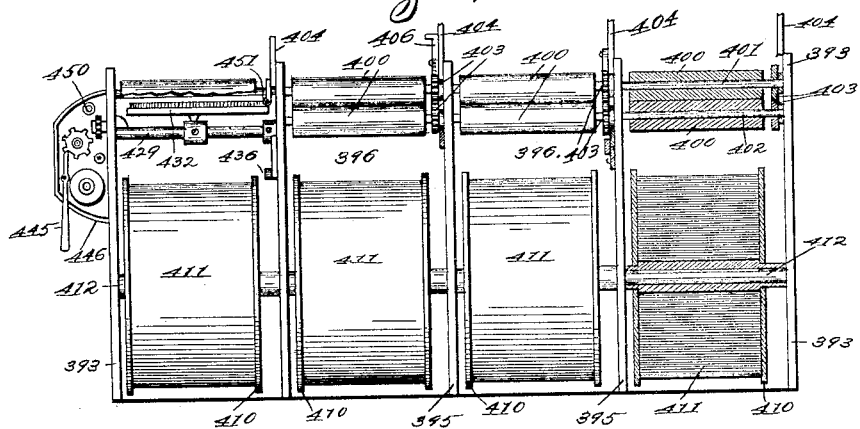
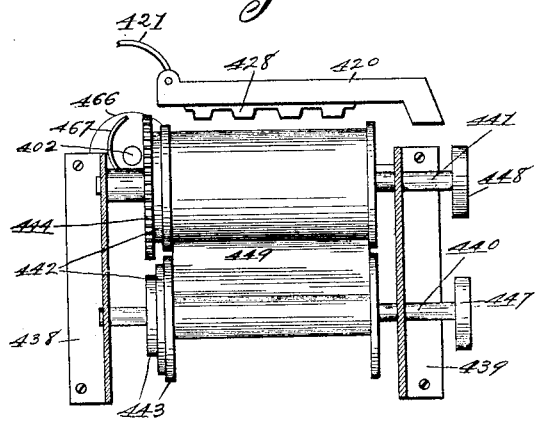
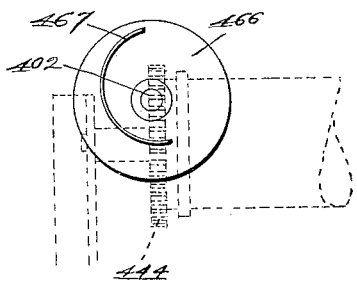
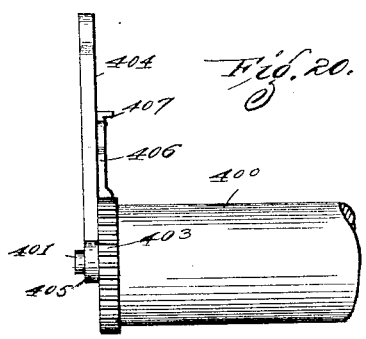
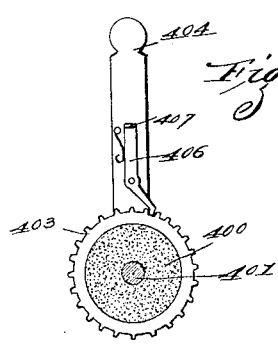

(No Model.) 14 Sheets—Sheet 11.
R. BAUMANN & T. H. WURMB.
COMBINED CASH REGISTER, INDICATOR, AND RECORDER.
No. 585,248. Patented June 29, 1897.
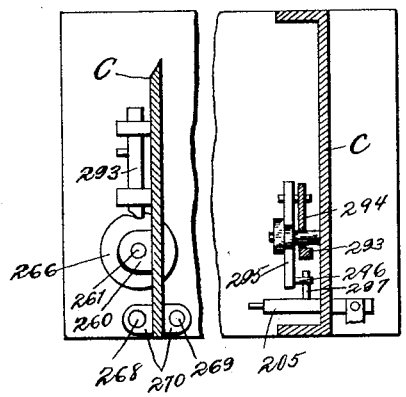
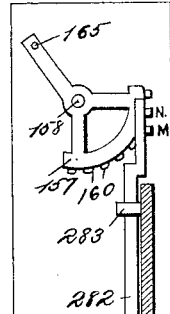
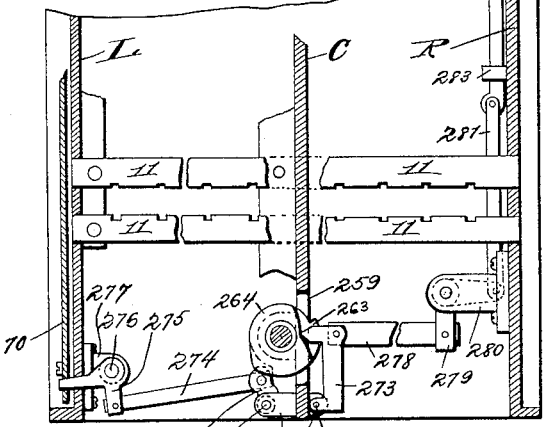
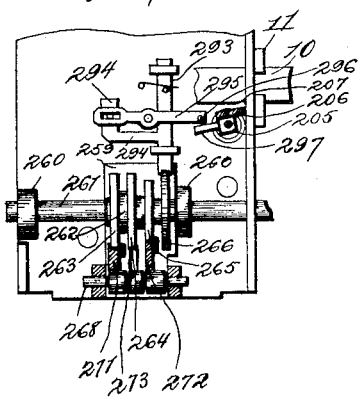
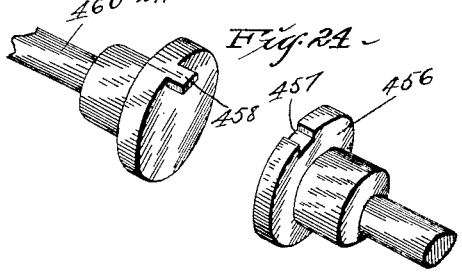

(No Model.) 14 Sheets—Sheet 12.
R. BAUMANN & T. H. WURMB.
COMBINED CASH REGISTER, INDICATOR, AND RECORDER.
No. 585,248. Patented June 29, 1897.
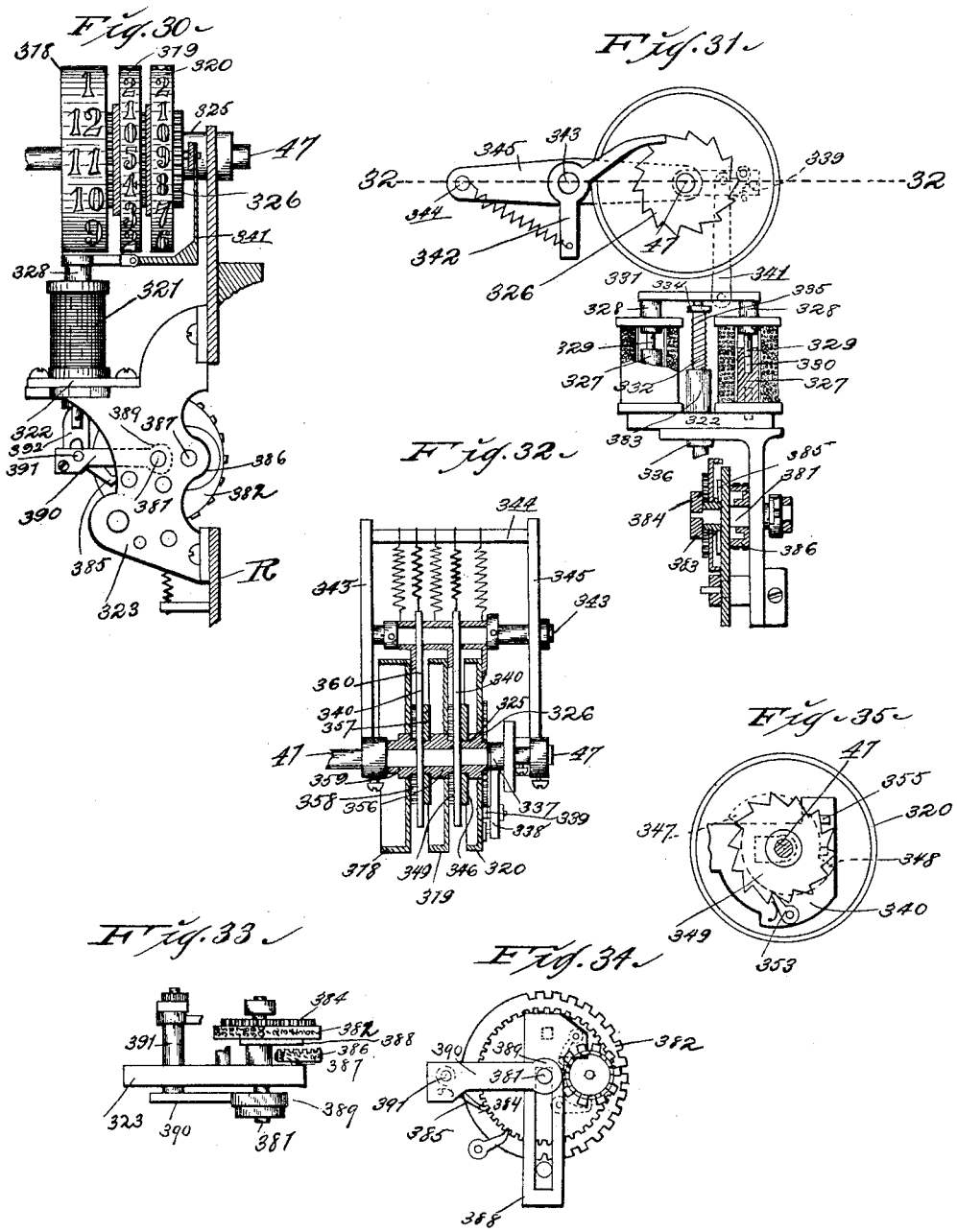
Attest
A. A. Blaukmuster
N. P. Smith
Inventors:
Robert Baumann and
Theodore H. Wurmb
by Higdon & Higdon & Longan
Attys (No Model.) 14 Sheets—Sheet 13.
R. BAUMANN & T. H. WURMB.
COMBINED CASH REGISTER, INDICATOR, AND RECORDER.
No. 585,248. Patented June 29, 1897.
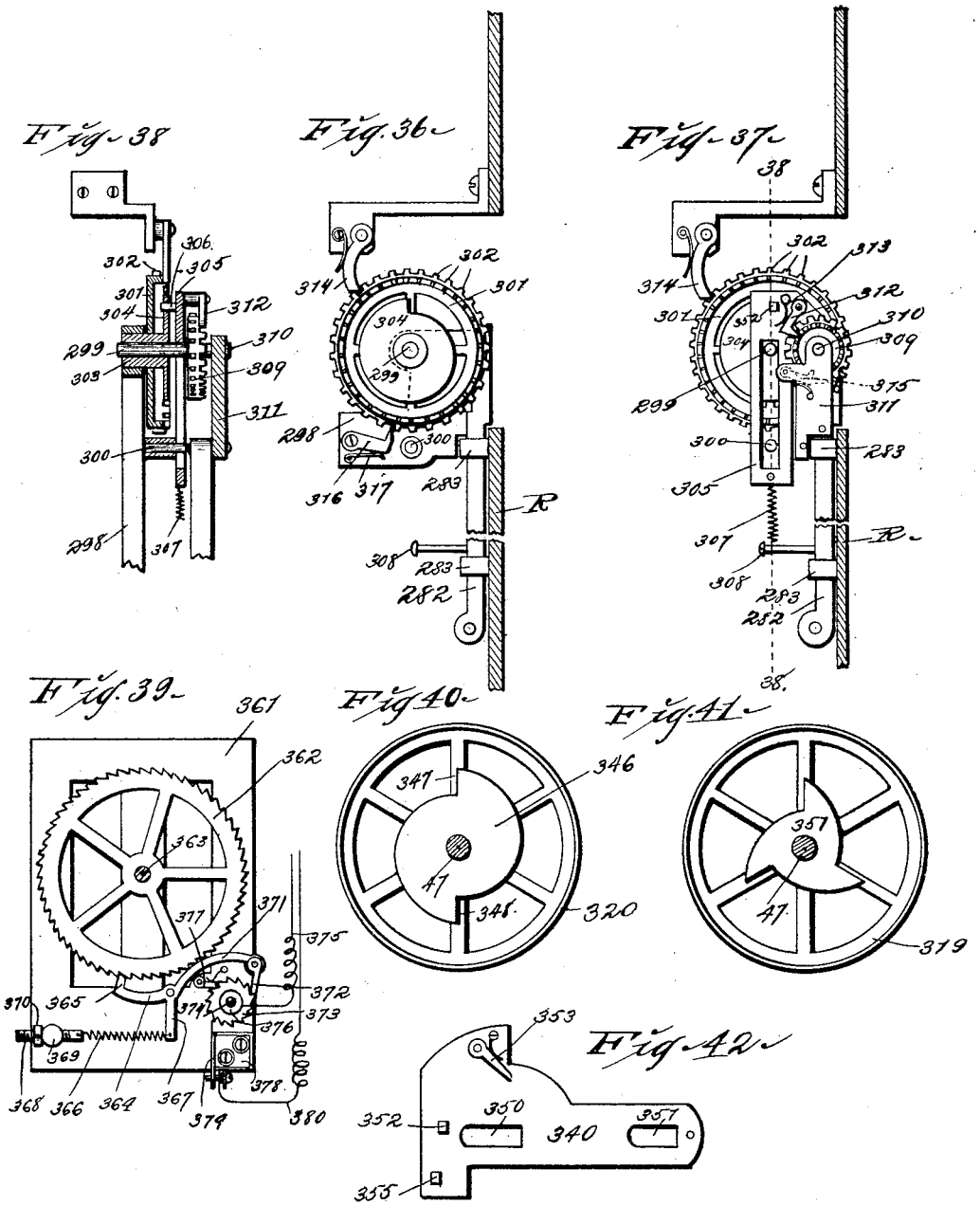

(No Model.) 14 Sheets—Sheet 14.
R. BAUMANN & T. H. WURMB.
COMBINED CASH REGISTER, INDICATOR, AND RECORDER.
No. 585,248. Patented June 29, 1897.
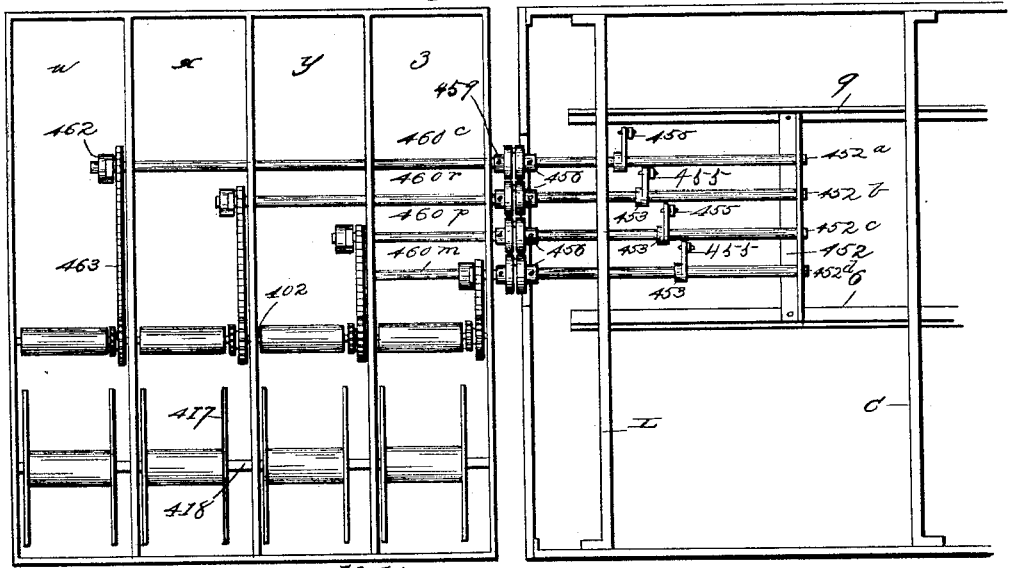
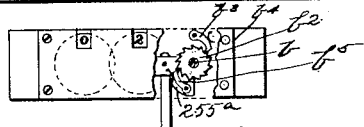
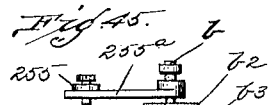
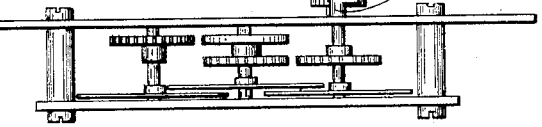
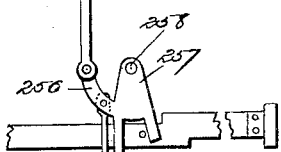
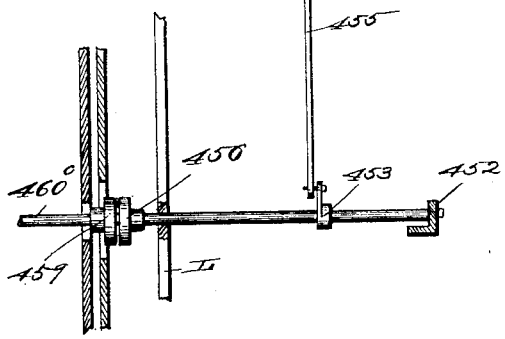
Attest:
W. P. Smith
Maude Griffin
Inventors
Robert Baumann and
Theodore H. Wurmb.
By Higdon Higdon & Longan
Attys

United States Patent Office.

ROBERT BAUMANN AND THEODORE H. WURMB, OF ST. LOUIS, MISSOURI.

COMBINED CASH REGISTER, INDICATOR, AND RECORDER.

SPECIFICATION forming part of Letters Patent No. 585,248, dated June 29, 1897.

Application filed June 12, 1894. Serial No. 514,356. (No model.)

*To all whom it may concern:*

Be it known that we, ROBERT BAUMANN and THEODORE H. WURMB, of the city of St. Louis, State of Missouri, have invented certain new and useful Improvements in a Combined Cash Register, Indicator, and Recorder, of which the following is a full, clear, and exact description, reference being had to the accompanying drawings, forming a part hereof.

Our invention relates to devices for registering and indicating numbers, said numbers indicating the amount of sales, receipts, and disbursements, the recording of the same upon either a slip or a continuous roll of paper, the printing of the date on which the transaction is made, the printing of the details of the transaction, the indicating, registering, and printing of the exact time of such transaction, together with an autographic register and recorder, and the total adding of all of the transactions made.

Our invention consists, together with other novel features of construction, of indicating and registering devices operated by a plurality of series of keys, a series of printing devices operated in connection with said keys, an autographic register and recorder operated in connection with certain parts of our device, a time-indicator operated by a magnet or magnets, and electrical conductors extending from a clock or other timepiece to said time-indicator, and various other arrangements and combinations of parts, as hereinafter shown, set forth, and illustrated by the accompanying drawings, in which—

Figure 22:
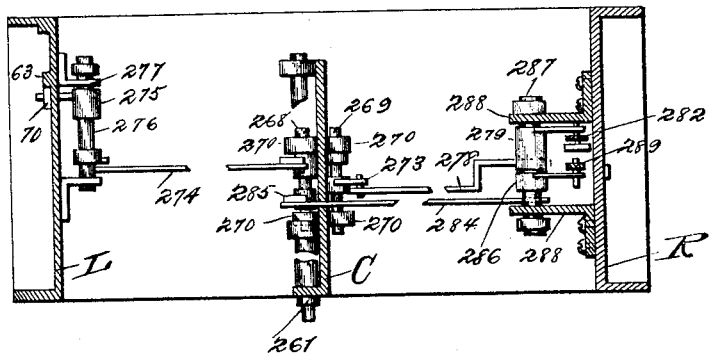

Figure 1 is a front elevation of our improved register in position as required for practical use. In this figure but a slight portion of the autographic recorder and register is shown. Fig. 2 is a central longitudinal sectional view of our device, the key-bars and various operating parts being shown in their normal position. Fig. 3 is a vertical sectional view taken on the indicated line 3 3 of Fig. 2. Figs. 4, 5, and 6 are transverse sectional views showing various operating devices in connection with the keys in their normal positions. Fig. 7 is a horizontal sectional view taken approximately on the line 7 7 of Fig. 6. Fig. 8 is a detail face view of an operating mechanism located upon the lower ends of the upright bars seen in Fig. 5. Fig. 9 is a transverse sectional view of the operating mechanism connected to what we term a "special sales-key." Fig. 10 is a transverse sectional view taken approximately on the line 10 10 of Fig. 2 and showing the bell-striking devices and operating mechanism, together with the feed-rollers and a portion of the automatic printing devices. Fig. 11 is a longitudinal sectional view looking from the front of the machine and showing a portion of the series of keys, also a special printing device and a mechanism connected thereto of which we make use. Fig. 12 is a longitudinal sectional view taken on the line 12 12 of Fig. 2. Fig. 13 is a vertical longitudinal sectional view taken approximately on the line 13 13 of Fig. 4. Fig. 14 is a perspective view of a releasing mechanism of which we make use, said releasing mechanism being shown in side elevation in Figs. 5 and 9. Fig. 15 is a top plan view of our autographic recorder and register, Fig. 16 being a sectional view taken approximately on the line 16 16 of Fig. 15. Fig. 17 is a longitudinal cross-sectional view of the autographic register, taken approximately on the line 17 17 of Fig. 16. Fig. 18 is a detail view of a printing device of which we make use in this autographic recorder and register. Fig. 19 is a detail view of a rotating device in connection with the autographic register and recorder, Figs. 20 and 21 being respectively front and sectional views of a rotating hand-lever used in our autographic register and recorder. Figs. 22 and 23 are respectively longitudinal and vertical cross-sectional views of operating mechanisms for the semidaily date-printer. Fig. 24 is a perspective view of the ends of the connecting-rods between the cash-register and autographic recorder and register. Fig. 25 is a detail sectional view of an operating device for locking the keys to the cash-register, Fig. 26 being a front elevation of this operating mechanism. Fig. 27 is a side elevation of a series of cam-wheels that operate different parts of the mechanism. Fig. 28 is an enlarged view of a spring-actuated pawl used in the cash register and indicator. Fig. 29 is a facsimile of a portion of the continuous roll of paper as it is discharged from the cash register and indicator. Fig. 30 is a side elevation of the electrically-operated time-indicator, Fig. 31 being a front elevation of the same. Fig. 32 is a horizontal sectional view on the indicated line 32 32 of Fig. 31. Figs. 33, 34, and 35 show details of construction in the electric time-indicator. Figs. 36 and 37 are side elevations of the automatic date-printer, Fig. 38 being a vertical sectional view on the indicated line 38 38 of Fig. 37. Fig. 39 is a detail view of the electrical connection between a clock or other timepiece and our improved date and time printer and indicator. Figs. 40, 41, and 42 illustrate details of construction of this improved date and time printer and indicator. Fig. 43 is a horizontal sectional view showing the connection between the cash-register and the autographic register. Fig. 44 is a vertical sectional view showing the connection between the detail-keys and detail-adders and between the detail-keys and the autographic register. Fig. 45 is a top plan view of one of the detail-adders.

Similar numerals and letters refer to similar parts throughout the several views.

In the construction of the machine as shown the outer casing or frame is indicated by the numeral 1. This casing comprises the rectangular base 2 and rectangular upper portion 3. Transversely positioned within this casing 1 are three cast frames, the frame to the right being indicated by the letter R, the center frame C, and the frame to the left L. Said frames are bolted and held together by angle-bars 4, 5, 6, 7, 8, and 9.

Keys 10, the denominations of which are shown in Fig. 1, are held to reciprocate in plates 11, secured to the front of the upright frame 3, the series of keys 10$^a$ representing units of cents; 10$^b$, the tens of cents; 10$^c$, the uneven multiples of five cents up to one dollar; 10$^d$ 10$^e$ 10$^f$, the dollars as indicated thereon, the keys 10$^g$ being detail and adding keys. The distance of travel of all these series of keys is the same except those of the series 10$^c$. These keys extend a short distance into the upright rectangular casing 3 and are held to slide in the plates 12, located near the rear of the casing.

Shoulders 13 and 14, (see Fig. 3,) formed on the lower end of the keys, form a stop and regulate the inward and outward movement of said keys. These keys are pressed forward to their normal position by swinging racks or frames 15, Figs. 2 and 4, which consist of cast end pieces 16, the lower ends of the lower frame being journaled to a rod or spindle 17, which in turn is journaled in the frames L, C, and R. The upper ends of said end pieces 16 are connected by a rod 18, which normally presses against the ends of the keys 10$^c$ and 10$^b$ by reason of a coil-spring 19, secured to the frame L and wound around the lower rod 17. In a like manner the other series of keys are fitted with these frames, their action being to always hold the keys at the limit of their outward movement.

Journaled in the frames L, C, and R, and approximately in the center of the machine and directly above the series of keys, are spindles 20, on which are rigidly mounted pinions 21, there being nine of these pinions 21 on each shaft, or one for each key of each series. The first key of each series is provided on its top edge with one tooth, the next adjoining key of the next series having two teeth, and each succeeding key being provided with one more tooth, until the last or ninth key, which has nine teeth. As there is one pinion 21 for each key, said pinion will be engaged and partially rotated by said tooth or teeth on the key whenever said key is pressed in. Said key, however, travels a slight distance before it engages with said pinion 21. Each of the spindles 20 is also provided with one larger pinion 22, which is approximately twice the size of the smaller pinion 21. A rack 23, always engaging with the teeth of said large pinion 22, is held in place by collars 24, which in turn are rigidly secured to tubes 25, said tubes being vertically positioned within the upright casing 3 and held to reciprocate in a vertical direction by being journaled in the angle-bars 7 and 8. The upper ends of these tubes are provided with stop-collars 26, directly beneath which is placed a felt, leather, or rubber washer 27. Tubes 28, directly in the rear of the tubes 25, are held to vertically reciprocate in the bearings formed by the angle-bars 29 and 30. Arms 31, the forward ends of which are formed into collars and secured to the tube 25, have open rear ends adapted to engage the tube 28 and prevent the tube 25 from being rotated during its vertical movement.

An arm 32, a counterpart of the arm 31, is rigidly secured to the tube 28 and prevents the latter from rotating during its vertical movement.

Tubes 33 are adapted to vertically reciprocate upon the upper end of the tube 28, said tubes 33 being provided with two forwardly-extending arms 34 35, and have attached to their forward ends a rack 36. The lower end of said rack slides in a groove cut in a plate 37, said plate being secured to the angle-bar 8, which is in turn secured to the angle-bar 30.

Ratchet-racks 39, firmly secured to the reciprocating tubes 28 by means of collars 40 and the arm 32, are each provided with a series of ten teeth, there being one large pinion 22, one rack 23, and one set of tubes 25, as described, for each series of keys.

A series of pawls 41, one for each of the racks 39, is mounted upon a tube or shaft 42, and said pawls are normally in engagement between the teeth of said rack 39. The points of these pawls 41, engaging between the teeth of the racks 39, serve to hold said racks at any one of the nine points of height that they assume while being operated upon by the keys. A key of the lowest denomination of any of the series being pressed in, the tooth numbered "1" on the rack 39 rises to the point of the pawl, or if the adjoining key be pressed in the tooth numbered "2" will rise to the point of the pawl. These pawls are mounted upon the tubes 42 by means of a pin or screw 43, passing through a slot 44 in the sleeve of the pawl and into the tube 42. (See Fig. 28.)

The pawls 41 are arranged upon the shaft 42 in such a way by means of the slot 44 and the pin 43 working in said slot that the point of one of said pawls may be raised by operation of the rack 39 without raising the points of any of the other pawls; but when the shaft 42 is rotated in the proper direction the points of all the pawls are raised simultaneously and all of the racks thereby released.

Another pin 45, rigidly mounted in the tube 42, is provided with a coil-spring 46, which normally engages against and presses the pawl 41 against the ratchet-rack 39.

Any number of the racks 39 may be raised to any desired point and held in such raised position by their respective pawls, providing the tube 42, carrying the pawls 41, is in the position shown in Fig. 3. When said tube 42 is turned from right to left, the pawls will release the racks, which, together with the tubes 28 and 33, will assume their normal positions by reason of the keys assuming their normal positions.

A shaft or spindle 47, journaled in the frames L and R and extending longitudinally of the machine, has loosely mounted thereon a series of indicating-cylinders 48, Figs. 2 and 3, said cylinders being preferably made of celluloid or like material, having marked or stamped upon their periphery the indicating-numerals from "0" to "9." These cylinders are provided with collars 49, which collars are provided with gear wheels or pinions 50, said pinions being in engagement with the racks 36. Should any of the keys be pressed in, the corresponding cylinder or cylinders will be turned to show the amount on their face through an opening 51 in the front upper casing of the machine. Such cylinders are thus held up until the pawls 41 release the ratchet-racks 39, thus allowing said cylinders to return to zero by reason of the weight of the tube 33 and rack 36, their downward movement being independent of the tube 28.

Any common adding-machine, but preferably the one a patent for which was granted June 26, 1894, to one of us, (Robert Baumann,) No. 522,098, is placed in the front of the register-casing and is operated by the mechanism on the interior of the register in the following manner: A longitudinal plate 52, Fig. 3, which is the back plate of the adding-machine, is provided with upwardly-extending bearings 53, which receive the shouldered ends of the spindles 54, the other ends of said spindles 54 being journaled in the plate 55, secured to the angle-bar 29. Pinions 56, journaled on the spindles 54, mesh with pinions 57, mounted upon the adding-wheel spindles 58. The spindles 58 have mounted thereon pinions 59, which mesh with racks 60, said racks being secured to the tubes 25 by means of collars 61 and 62. The pinion 57 is shown in dotted lines in Fig. 3.

Whenever a key on the register is pushed in and the tube 25 raised, the rack 60, secured to said tube, will rotate the pinions 56 59, which in turn meshing with the pinions on the shaft 58 of the adding-machine will operate said adding-machine.

63 and 64 designate boxes formed on the frame L and are adapted to form guides for plates 65, there being three of these plates 65 or one for each of the rods 18. The rear ends of these plates 65 are yoked to engage said rod 18, and running longitudinally their length and near their forward ends are slots 67, which are engaged by pins 68 upon the boxes 63. Thus the plates 65 are given a horizontal reciprocating movement similar to that of the keys. The forward ends of these plates 65 are widened and provided with inclines 69.

A flat bar 70 is held by means of antifriction-rollers 71 to vertically reciprocate against the frame L. A series of vibrating dogs 72 are pivotally mounted on the face of this bar 70, their rearward and upward movement being restricted by pins 73. The normal position of these vibrating dogs 72 is that shown in Fig. 5, their lower ends being adjacent the inclines 69 on the widened portions of the plates 65. When a key is pushed in, the plate 65 will necessarily follow the movement of said key. The inclines 69 on the plates 65 will raise the dogs 72, thereby raising the bar 70, which in turn operates a mechanism about to be described, thus releasing the racks 39, which allows the indicating-cylinders to turn to zero. A key being pushed in to its fullest extent, the dog 72 drops past the rear incline 74, thereby dropping the bar 70, which causes the pawls 42 to engage with the racks 39 and hold up such tubes 28 as may have been raised. Upon releasing the key or allowing it to return to its normal position the plates 65, following the movement of the key, swing the vibrating dog 72 to its normal position when said plate 65 has resumed its normal position.

As it is impossible to press a number of keys of different series at one time and in order to have the indicators show the total amount, we have provided what we term a "special" or "combination" sales-key 75, now to be described, Figs. 7 and 9. This key is pivotally secured to the frame L and is provided with a downwardly-pending arm 76. By means of a bar 77 this downwardly-pending arm 76 is secured to the lowermost plate 65. The movement of this special sales-key is restricted by a stop-pin 78 in a recess 79 and is held in its normal position by a coil-spring 80.

Referring now to Figs. 1 4, 5, and 9, we will describe the connection between the upper end of the bar 70 and the tube 42. Projecting outwardly from said bar 70 and near its upper portion is a bevel-faced pin 81. The beveled or inclined face of the pin 81 extends from its lower side backwardly and upwardly to its upper side and at an angle of approximately forty-five degrees relative to said lower side. A bell-crank 82 is pivoted upon an extended bearing-pin 83. The pin 84 is somewhat longer than the pin 82, and the pin 83 is considerably longer than the pin 84. An expansive coil-spring $83^a$ is placed upon the pin 83 outside of the bearing in the bell-crank 82 and in engagement with said bell-crank bearing, and a nut $83^b$ is placed upon the extreme outer end of said pin 83, as required to hold said spring in position and in engagement with said bearing. The upper end of this bell-crank 82 is engaged by an extended bearing-pin 84, projecting from the end of a connecting-bar 85, held to slide in guide-pins 86 and connected at its rear end to an arm 87, rigidly mounted upon the tube 42. This bar 85 is held forward or in its normal position by reason of a pressure-spring 88. The bearing-pins 83 and 84 are of such a length that when the bell-crank 82 slides outwardly upon said pins the forward arm of said bell-crank will clear the end of the pin 81, as required, to allow said bell-crank 82 to turn upon the pin 83 and operate the pin 84 and allow the forward arm of said bell-crank 82 to vibrate past the outer end of the pin 81 and without engaging said pin.

Pivoted to the face of the frame L is a plate 89, which is provided with a segmental portion 90, having therein a segmental slot 91, through which the pin 83 passes. An arm 92 extends rearwardly from the plate 89 and has secured to its end the upper end of a wire rod 93. A pin 94 restricts the movement of this plate 89, and a coil-spring 95 tends to hold said plate in its downward or normal position. Between the segmental slot 91 and the edge of the segmental portion 90 is a bevel cam-face 96. The wire rod 93 connects the plate 89 with a bell-crank 97, which is secured to a spindle 98, secured to the frame L. A pin 99, projecting from the lower face of the lower plate 65, is intended to engage against the vertical arm of the bell-crank 97 whenever the special or combination sales-key is pressed downward. Thus while the special or combination sales-key is being held down the proper keys are pressed in and their corresponding indicators turned.

When the special or combination sales-key is pressed downwardly, the pin 99 engages the front face and upper end of the vertical arm of the bell-crank lever 97 and correspondingly depresses the free end of the horizontal arm of said bell-crank, thus drawing down upon the connecting-rod 93 and depressing the free end of the arm 92 and turning the plate 89. The cam-face 96 will then engage against the rear side of the crank 82 and will move said crank outwardly upon the pins 83 and 84 until the free end of the forward or horizontal arm of said crank clears the end of the pin 81.

When the special or combination sales-key is released, the spring 95 will operate to return the plate 89 to its normal position, and the expansive coil-spring $83^a$ will operate to slide the bell-crank 82 upon the pin 83 to its normal position, and in returning to its normal position the forward arm of said bell-crank 82 will strike the beveled or inclined face of the pin 81 and will be deflected upwardly to a position above said pin 81.

For recording amounts composed of three figures or more—for instance, "$9.67"—the special sales-key is used, but should the amount be composed of only one figure and the rest ciphers—for instance, "$50.00"—the special sales-key is not used.

A lug or boss 100 is formed integral with the lower end of the plate 65 and is intended to engage against the ends of a depending pivoted bar, 101 a portion of which engaging against pins 102 upon the vertically-positioned bar 103 raises the same. This action takes place whenever a key is pressed in.

A shaft 104, journaled in and extending through the frames L, C, and R, has secured upon its left end an arm 105, the same being provided with a pin 106, which is engaged by a forked projection 107 on the lower end of the vertically-positioned bar 103.

Whenever a key is pressed in and the pivoted plate 101 raises the bar 103, it necessarily follows that the shaft 104 will be slightly rotated. On the right end of the shaft 104 is secured an arm 108, having pivotally attached thereto a spring-actuated pawl 109, which engages against the teeth of a ratchet-wheel 110. Said ratchet-wheel is journaled to the frame R and is successively turned by the motion of the spindle 104, backward movement of the same being prevented by a spring-actuated pawl 111.

An arm 112, pivoted to the frame R and having a bell-striker 113 secured thereto, is vibrated by reason of the teeth of the ratchet-wheel 109 engaging against its forward end. Thus the bell is sounded whenever a key is pressed in.

A coil-spring 114 holds the arm 112 and bell-striker 113 in their normal positions. On the right-hand side of the center frame C is held to vertically reciprocate a locking-bolt 115. A vibrating arm 116, pivoted to the frame C, forms a connection between the locking-bolt 115 and the arm 117, which is secured to the spindle 104. Whenever a key is pressed in and the spindle 104 slightly rotated, the locking-bolt 115 will necessarily be withdrawn, thus allowing the cover of the cash-drawer to be opened.

The recording of denominations, such as "15," "25," "35," &c., and so on up to "95," is accomplished by the series of keys marked $10^c$, and is effected by first operating the adding-wheel representing the units of cents and then the adding-wheel representing the tens of cents, this being done while any of the keys of the series $10^c$ is pressed in. A longer range of motion for this series of keys must necessarily be provided. Said series of keys is not provided with the swinging frame 15 to normally press it to its outward position.

A spindle 118 is journaled in the end frames L and R, extends through the frame R, and has mounted upon it nine pinions 119, or one for each of these series of keys. The lower side of these keys is toothed, each key having the same number of teeth, as indicated by the numeral 120, and adapted to mesh with said pinions 119 whenever one of these series of keys is pushed in.

The spindle 118 has secured to it adjacent the inside of the frame R an ordinary clock-spring 121, the loose end of which is attached by means of a pin 122 to the frame R. Each of the pinions 119 has attached thereto an arm 123, which by pressing against a pin 124, secured to the face of the key, pushes said keys to their normal positions. This pin 124 also forms a stop to restrict the movement of the spindle 118. The keys being out of gear with their respective gear-wheels when in their normal positions any one key may be pushed in without disturbing the other.

An eccentric disk 125 is secured to the left end of the spindle 118, Fig. 8. A projection 126 on the bar 70 and a projection 127 on the bar 103 extend inwardly through an opening in the frame L, Fig. 13, said projection 126 on the bar 70 having pivotally attached thereto a vibrating arm 128, and the projection 127 on the bar 103 having attached thereto a pin 129.

The spindle 118, carrying the eccentric disk 125, will slightly rotate if any one of the keys of the series 10$^c$ be pressed in. The eccentric disk 125 will by engaging against the arm 128 raise the bar 70 and passing onward engage against the pin 129, thus raising the bar 103. Thus the corresponding indicating-cylinders will be rotated to their proper position, the locking-bolt 115 withdrawn, and the bell sounded.

The cylinders are held in position by the action of the pawls 41 acting independently of each other upon the shaft 42 by means of the pins 43, passing through and operating in the slot 44 in said pawls. When one cylinder is placed in its desired position, the pawl 41, which controls that cylinder, is pressed against the rack 39 by the operation of the coil-spring 46 on the pin 45 and the operation of positioning the next cylinder, and operating the next pawl does not disturb the pawl already positioned.

The extreme right end of the spindle 118 is provided with an arm 130, which has secured to it a pin 131, the same being in contact with a projection 132 of a vertically-reciprocating bar 133. The upper end of this vertically-reciprocating bar 133 is of an inverted-U shape, the downwardly-pending portion 134 of which is geared and adapted to mesh with a pinion 135, rigidly secured to the spindle 20 of the series of keys 10$^a$. By pushing in a key of the series 10$^c$ the spindle 118 will be rotated, which in turn will raise the vertically-reciprocating bar 133, thus rotating the spindle 20 of the series 10$^a$, which in turn rotates the wheel representing units of cents five figures forward and raising the corresponding indicating-cylinder to show the figure "5."

A pawl 136, pivoted to the frame R, is held in normal position by a pin 137, which is secured on the arm 130. When the sliding bar 133 is raised to a given height and the arm of the pawl 136 is released, said pawl will by reason of a wire spring 138 engage with a notch 139 in the bar 133. The key being released, the arm 130 on the spindle 118 resumes its normal position. The pawl being disengaged from the notch 139 the bar 133 resumes its normal position.

The extreme right ends of the spindles 20 of the series 10$^b$ and 10$^c$ have secured to their ends pinions 140 and 141, between which is interposed a pinion 142, the same being mounted upon the frame R.

If ninety-five cents is to be recorded, the key 95 is pressed in and the spindle 118 rotated, thereby raising the bar 133, which necessarily turns the spindle 20 of the series 10$^a$. This turns the adding-wheel five figures forward and at the same time turns the corresponding indicating-cylinder to "5." This being done the teeth on the upper side of the key come in contact with the teeth of the pinion 22 of the corresponding cylinder and cause the spindle 20 of the series 10$^b$ to turn its corresponding adding-wheel representing tens of cents nine figures forward, and also turn the indicating-cylinder. Both cylinders now indicate the amount until another key is operated upon.

Referring now to Figs. 2 and 3, we will describe the cash-drawer of our improved cash-register. This drawer 143 is inclosed by and adapted to slide in the lower rectangular portion 2 of the cash-register. The cover 144 of the drawer has the depending side flanges 145, to which are journaled rollers or pulleys 146, which travel between guide-rails 147 and 148, said guide-rails being slightly inclined rearwardly. Thus the cover 144 is permitted to travel rearwardly when unlocked to expose the cash-drawer 143. A notch or indenture 149 is formed in the rear portion of the upper face of the cover and is adapted to receive the lower point of the locking-bolt 115, thereby locking said cover whenever it is in the position as shown in Fig. 3.

A horizontally-positioned bar 150, having on its forward end a downwardly-pending tongue 151, is held to slide in a bearing 152, said bearing being positioned upon an angle-bar 9, running longitudinally of the machine.

A coil-spring 153, around the extended portion of the bar 150, exerts a rearward pull upon said bar. A lug 154 extends upwardly from the rear of the cover 144 and is adapted to be engaged by the tongue 151. When a key is pushed in, the locking-bolt 115 is raised by the action of the shaft 104, arm 117, and pivoted arm 116, thus releasing the cover, which is then pulled backward by the action of the coil-spring 153 upon the bar 150, carrying the tongue 151. An upwardly-extending flange 155 serves to bring the drawer-cover forward, and thus close all access to the drawer 143. The drawer 143 can, while the cover 144 is open, be pushed rearwardly in order to have access to the lower compartment or compartments 156.

The machine as described so far constitutes the improvements in cash registers and indicators.

The novel features—such as the detail printing on a continuous strip of paper of all the transactions, the printing of the time of such transactions, the automatic printing of the month, day, hour, and minute when the machine is opened and set for business in the morning and locked for the night, the automatic interlocking system of the keys to make the printing obligatory, the detail autographic register and recorder, the total adding of each day's business, the electromechanical time-indicator, and the grand-total-adding machine—will now be described.

Referring to Figs. 2 and 12, the numeral 157 designates a series of type-segments, one of which is provided for each series of keys. These type-segments are journaled in the shaft 158, which is secured to a bracket 159, depending from the angle-bar 8. The rubber printing-type 160 are attached or secured to the faces of the segmental type-wheels 157 and correspond with the different denominations of the individual keys of one series, usually nine in number.

In Fig. 2 the segmental type-wheels are shown in their normal position and the type representing zero on the printing-line. Arms 161 are journaled on the shaft 162, secured to the bracket 159, and have their rear ends formed and adapted to engage pins 163, said pins being secured to collars 164, located upon the tubes 25. The other ends of these arms 161 are slotted and adapted to engage pins 165 upon the ends of the frames 166 of the segmental type-wheels 157. As all of said arms 161 are mounted upon the shaft 162 and as the distance of each succeeding arm between the pivot 162 and the pins 163 is lengthened, the distances on the forward ends, or between the pins 165 and pivot 162, must be proportionately decreased.

The continuous roll of paper 167 is conveniently placed in the top portion of the machine, from thence extended downwardly over the face of the printing-type 160, and held to be turned forward between two rubber-faced rollers 168. Said rubber rollers are placed upon spindles 169 and 170, which are journaled in brackets 171 and 172, the same being secured to the outside face of the frame R.

A suitable opening 173 is formed in the frame R to provide for the free working of the printing mechanism and the free passage of the paper strip. The spindles 169 and 170 are geared together at their ends outside the bracket 172 by means of the meshing pinions 174 175.

A spindle 176, journaled in the brackets 171 172, is provided with two upwardly-projecting arms 177, the same being connected at their upper ends by a bar 178, upon which is fastened a soft-rubber strip 179, which is intended to strike against the face of the printing-type. The end of the spindle 170 has secured to it outside the bracket 171 a ratchet-wheel 180. A reciprocating arm 181, pivoted on said spindle adjacent the ratchet-wheel 180, has pivotally secured upon its upper end a pawl 182, the point of which engages with the teeth of the ratchet-wheel 180. The lower end of this arm 181 is provided with a pin 183, which forms a connection with the forked end of the arm 184, the collar 185 of said arm being journaled to the spindle 176. A short projection 186 extends from the arm 185 through the frame R, and a retractile coil-spring 187 is attached at one end to the projection 186 and at the other end to the inwardly-projecting portion 292 of the vertically-reciprocating bar 191, as shown in Fig. 11.

A band of printing tape or ribbon 188, such as is commonly used in type-writing machines, &c., is placed between the printing-type and the continuous paper strip. The spring 187 being pulled downwardly by the operation of the vertically-reciprocating bar 191, the arms 177, carrying the rubber strip 179, upon the cross-bar 178 will be pressed against the paper strip, printing-tape, and the face of the printing-type, such as may be on the printing-line, thereby effecting the printing of the transaction at the same time the proper key is operated on.

A spindle 189, journaled in and extending through the frames L and R, has secured to its extreme right end an arm 190. A flat bar 191, held to vertically reciprocate on the outside face of the frame R by means of the roller-bearings 192, has its upper end bent so as to extend through an opening 193 in the frame R, where it connects with the lower end of a coil-spring 187. A bell-crank 194, pivoted to the frame R, has one end pivotally connected to the end of the arm 190 by means of a connecting-link 195. The other end of this bell-crank rests upon a pin 196, secured to the vertically-reciprocating bar 191. This allows said bar to move downwardly without disturbing the bell-crank and spindle 189. This spindle 189 has firmly secured upon the inside of each of the end frames arms or printing-levers 197, the collar 198 of this arm 197 having formed on its lower end a recess 199. A pin 200, secured to the frame R, extends through this recess 199, and thereby regulates and restricts the downward movement of said printing-lever. A coil-spring 201, attached to a pin 202 on said collar and to a pin 203, extending from the frame R, holds the printing-lever in its normal position. The ends of the printing-levers are provided with cross-bars or handles 204. The printing mechanism can be operated and the printing may be accomplised by pressing down either one of these printing-levers.

Referring now to Figs. 4 and 6, we will describe the interlocking system of the keys. Rods 205, preferably square and having their ends rounded and journaled in the end frames, lie immediately beneath the rows of keys and near the front plates 11. Plates 206, rigidly secured to said rods, project a slight distance forward and upward and are adapted to engage with the notches 207 on the lower edges of the keys, thereby locking the same. The rounded ends of the rods 205 extend through the frame R and have secured to them arms 208, the ends of the same being pivotally connected to a vertically-reciprocating lever 209. In Fig. 10 this lever and the arms 208 are shown in their normal positions. A bell-crank 210, pivoted to the frame R, has its downwardly-projecting arm pointed and adapted to engage with a notch 211 in the vertically-reciprocating lever 209. A pin 212 on the sliding bar 191 is adapted to engage against the horizontal arm of the bell-crank 210 whenever the printing-lever is pressed down. A spring 213 holds the bell-crank in its normal position, or as that shown in Fig. 10. The left end of the upper rod 205 extends through the frame L and has secured to it an arm 214. A circular plate 215 is mounted upon the frame L and has two projecting arms 216 217. To the arm 216, and extending through a slot 218, formed in the frame L, is secured a knob 219. The circular part of the plate 215 is provided with two notches 220 221. A spring-actuated pawl 222, pivoted to the frame L, engages in these notches and serves to hold the plate 215 in a locked position and also allow it to turn by manipulating the knob 219. A pin 223, secured to the arm 217, forms a guide for the slotted plate 224, the lower end of said plate being pivotally connected to the arm 214. A reciprocating arm 225, centrally pivoted to the frame L, has upon its forward end a pin 250, which is adapted to press down the plate 224. The other end of this reciprocating arm 225 is forked and adapted to be engaged by a pin 227, secured to the arm 228, extending laterally from the vertically-reciprocating bar 103. When a key is pressed in, this vertically-reciprocating bar 103 is raised, the square rods 205 partially rotating, thus raising the plates 206, which firmly lock the keys, said keys being firmly locked until the printing-lever is pressed down, when the pin 212 pushes down the arm of the bell-crank 210, thus disengaging same from the notch 211 on the bar 209, which in turn is pushed up by a spring 229, the same being in contact with a pin 230 on the bar 209. A collar 231 is journaled to the frame L, and has three projecting arms 232, 233, and 234.

The upper end of an elongated bar 235 is pivoted to the circular plate 215. The lower end of this bar 235 is bifurcated and engages a pin 236 on the arm 234. The end of the arm 232 is adapted to engage in a notch 237 in the lowermost plate 65 when the combination sales-key is pressed in. To the end of the spindle 189 and outside the frame L is secured an arm 238, the upper end of which is connected to the arm 233, previously mentioned, by means of a bar 239, the end of this bar 239 being slotted and adapted to engage a pin 240 on said arm 233. The end of this slot in the bar 239 coming in contact with the pin 240, the point of the arm 232 is lifted from the notch 237 on the plate 65 when the printing-lever is pressed down to a point near its lowermost position. This action takes place at the same time the keys are unlocked. The other end of this bar 239 is provided along its upper edge with ratchet-teeth 241, which are adapted to be engaged by the point of a spring-actuated pawl 242 when said pawl is pressed down by a spring 243. Said pawl is pivoted to the frame L and has on its lower edge two notches 244 245.

A frame 246 is pivoted to the frame L and provided with a pin 247, normally held in the position as shown in Fig. 6 by a pin 248, secured to the bar 239. The pawl 242 is now free to engage with the ratchet-teeth while the printing-lever is pressed down, thereby locking the same at any position. The last quarter of an inch of the downward movement of the printing-lever brings the pin 249 on the bar 239 in contact with the pivoted frame 246. The pin 247 is pushed into the notch 245, which raises the point of the pawl above the ratchet-teeth and allows the printing-lever to freely return to its normal position. By turning the knob 219 to its uppermost position, or the point marked $x$, and as the arm 217 of the circular plate 215 is turned to the right, the pin 223 shifting the upper end of the slotted plate 224 out of contact with a pin 250 on the reciprocating arm 225, the key-locking mechanism is rendered inoperative. At the same time the bar 235 brings the point of the arm 232 out of range of contact with the notch 237 on the plate 65, and thereby prevents the combination sales-key from being locked down.

The operation and mechanism just described relate to releasing the parts after the operation of indicating, adding, and printing is completed. It sets the parts in position to commence a new transaction. (See Figs. 6 and 10.)

The spindle 98, the left end of which carries the bell-crank 97, has on its other end outside the frame R an arm 251. A vertically-reciprocating bar 252 connects the outer end of said arm 251 with the end of an arm 253, that projects from the bell-crank 210. The combination sales-key being pressed down, the pin 99 on the lower plate 65 turns the spindle 98, the arm 251 raises the bar 252, and the pin 254, which is secured to said bar, holds the bell-crank 210 in normal position, thereby admitting the recording and indicating of amounts of different denominations while the printer is set.

The register may be provided with any number of detail-keys, by which the number of different transactions are consecutively recorded on separate detail-adding machines. These detail-adding machines may be of any common form, but preferably are identical with that of the electric adding-machine patented by Robert Baumann, June 26, 1894, No. 522,097.

An arm $255^a$ is pivotally connected to one end of the units-wheel spindle $b$ of each detail-adder, and in turn said arms $255^a$ are pivotally connected to the bars 255 instead of being connected to an armature of an electromagnet, as in said former invention shown in said Patent No. 522,097.

In Fig. 2 we have indicated the location of five detail-adders to correspond to the five keys marked $10^g$ in Fig. 1, there being one adder connected to each of said keys and to be operated thereby. Since there are five detail-adders, there must necessarily be five of the arms $255^a$ and five of the bars 255 and five independent connections between said bars 255 and said keys, whereby said adders are operated. The lower end of each of the bars 255 is connected to one of the arms 256 of one of the reciprocating arms 257, said reciprocating arms 257 being held to turn freely on the spindle 258, which spindle is journaled in the frames L and C.

The detail-adding machines are placed immediately above the detail-keys, one for each key. The spindle 258 is placed above said keys near the front of the register-casing. The reciprocating arms 257, one for each of said keys, are pivotally mounted upon said spindle 258, and said reciprocating arms have two common projections which engage the key and are operated by the inward and outward motion of the key, thus imparting a reciprocating motion to the arm 257, thereby operating the bar 255 and the arm $255^a$.

Mounted upon the units-wheel spindle $b$ of each of the detail-adders and immediately beside the arm $255^a$ is a ratchet-wheel $b^2$, rigidly fixed to said spindle. A pawl $b^3$ is pivotally mounted upon the frame $b^4$ of each of the detail-adders, and its free end engages the teeth of the ratchet-wheel $b^2$ to prevent said wheel from rotating backward. A pawl $b^5$ is pivotally mounted upon the arm $255^a$, and its free end engages the teeth of the ratchet-wheel $b^2$, as required to rotate said wheel forwardly by the vibration of said arm $255^a$. The operation of the detail-key operates the corresponding bar 255, thereby operating the arm $255^a$ and rotating the ratchet-wheel $b^2$ one notch forward, thus turning the units-wheel of the detail-adder one figure forward, or, in other words, adding one. (See Figs. 44 and 45.)

An indicator-cylinder, showing the nature of the transaction recorded by the detail-keys, is placed upon the shaft 47 and operates in the same plane.

The detail-indicator cylinder has the word "Sale" substituted for zero. An extra type-wheel is provided for said detail-keys and indicator-cylinder, and is of the same construction and operates similarly to the ones previously described. The printing-type on said type-wheel may be such as to print either the words and meaning of the different transactions, as indicated on the face of said keys and cylinder in full, or in abbreviations, or by signs and characters.

Referring now to Figs. 1, 23, and 27, we will describe the automatic date-printer.

The center frame C is provided on its lower portion with an opening 259. On the left-hand side of said frame C and journaled in bearings 260 is a short spindle 261, which has mounted thereon a collar 262, to which are secured four disks, (numbered, respectively, 263, 264, 265, and 266.) To the front end of said spindle and outside the main casing is secured a crank 267. Immediately below the spindle 261 and on each side of the frame C are short spindles 268 and 269, journaled in bosses 270, secured to said frame C. The spindle 268 has loosely mounted thereon collars, each being provided with the upwardly-extending arms 271 and 272, the free ends of which are in contact, respectively, with the disks 263 and 265. The spindle 269 has loosely mounted thereon one collar, to which is secured an arm 273, which engages with the disk 264. The four disks are placed on the collar and spindle, as shown in Fig. 27.

The front plate of the machine adjacent the spindle 261 and crank 267 is provided with the indicating-letters "M" and "N." (See Fig. 1.)

A bar 274 is pivotally connected to the arm 271 and with the bell-crank 275, which is held to turn upon the spindle 276, the same being journaled in brackets 277, secured to the frame L. The free end of the bell-crank 275 extends through an opening in said frame L and engages with the lower end of the sliding bar 70 on the outside face of the frame L. The disk 263 being turned the bell-crank raises the bar 70, thereby causing the indicators and type-wheels to turn to zero. A bar 278 is pivotally connected with the downwardly-projecting arm of a bell-crank 279, pivoted in bearings 280, the free end of said bell-crank 279 being, by means of a vertically-reciprocating bar 281, connected to the vertically-reciprocating squared bar 282, said squared bar 282 sliding in bearings 283, rigidly secured to the inside of the frame R. The upper end of said rod 282 is provided with two printing-type "M" and "N." The three different diameters of the disk 263 insure three different points of positioning for said letters "M" and "N," the letter "N" being below the printing-line when the crank is positioned, as shown in Fig. 1, or at "M." A bar 284 connects an arm 285 with a bell-crank 286, which is pivotally positioned to the frame R by means of a spindle 287, journaled in brackets 288. (See Fig. 11.) A vertically-reciprocating bar 289 connects the loose end of the bell-crank with an inwardly-extending portion of the vertically-reciprocating bar 191. By turning the disk 265 one-half a revolution the point 291 on said disk engages the arm 285. This turns the same to the left, thereby lowering the vertically-reciprocating bar 191, which causes the printing of such letters and figures as may be on the printing-line.

An inwardly-projecting portion 292 of the vertically-reciprocating bar 191 is connected to the coil-spring 187 on the inwardly-extending arm of the bell-crank 186, previously mentioned. The lower end of a locking-bolt 293 (said bolt being held to slide on the left-hand side of the frame C) is normally in contact with the face of the disk 266. An arm 294, projecting from the bolt 293, is pivotally connected to a reciprocating arm 295, the loose end of which is provided with a pin 296, said pin engaging with a pin 297, which is secured to the squared rod 205. The crank 267 being turned the disk 266 raises the bolt 293, imparting an oscillating movement to the bar 295, thereby partially rotating the squared rod 205, which locks the keys. (See Figs. 23, 25, 26, and 27.)

In Figs. 36 and 38 a flange 298 is shown secured to the vertically-reciprocating bar 282, said flange having journaled to it two spindles 299 and 300. On the spindle 299 is loosely mounted a cylindrical wheel 301, the same having thirty-one teeth provided on its face and thirty-one printing-type 302 on its periphery. These thirty-one printing-type run, consecutively, from "1" to "31" and are designed to indicate the days of the month. To the collar 303, journaled on the shaft 299, is secured an eccentric-disk 304. A slotted plate 305 is held to slide upon the spindles 299 and 300. A pin 306, secured to said plate, is normally in contact with the face of the eccentric-disk 304, the plate 305 being held down by a coil-spring 307, the lower end of which is attached to a pin 308, which is secured to the vertically-reciprocating bar 282. A small cylindrical wheel 309 has twelve teeth provided upon its face and twelve printing-type representing the months upon its periphery. This wheel 309 is journaled upon a spindle 310, which is in turn held in a bearing 311, the same being secured to the flange 298 and to the bar 282. An actuating-pawl 312, pivotally secured to the sliding plate 305 and held in position by the spring 313, is adapted to engage with the teeth of the small wheel 309. A spring-actuated pawl 314, secured to a portion of the frame R, engages between the rubber printing-type of the cylindrical wheel 301. A spring-actuated detent-pawl 315 is pivotally secured to the support 311 and also engages with the teeth of the smaller printing-wheel. This pawl serves to hold the same in a locked position and prevents it being turned rearwardly. A pawl 316, held in position by a spring 317, is adapted to engage between the teeth on the face of the wheel 301. Vertical movement being imparted to the sliding bar 282, so as to bring the type "N" on the printing-line, the point of the pawl 314 will engage between the teeth on the face of the wheel 301. By raising the type "M" to the printing-line the wheel 309 is rotated one notch forward by the point of the pawl 312.

Figs. 36 and 37 show the eccentric-disk in the position when the plate 305 has been dropped to its lowest position. The wheel 301 being rotated forward the plate is gradually raised until the pin 306 passes the point of the eccentric, which drops said plate 305, and the wheel 309 is rotated one notch and figure forward.

The meaning of the two letters "M" and "N," above referred to and in connection with the crank 267, is "Morning" and "Night."

The crank in the various views is shown set at "M," or as the machine is open and ready for a day's business. At the closing of a day's business the crank is turned from "M" to "N," which, by reason of the various mechanisms described, the following operations successively take place. The indicators are all turned to zero, all keys are locked, the printing-type "N" raised to the printing-line, and the printing being done as shown by the facsimile in Fig. 29. In the morning, in order to position the parts of the said machine for a day's business, the crank must be turned from "N" to "M," which by so doing performs the following operations: The type "M" is raised to the printing-line, the date-wheel is turned, and the correct date set. The letter "M," the day, and the month are printed, as shown in the facsimile, and the keys unlocked.

We will now describe the mechanism and operation of the electromechanical time indicator and printer.

The three cylinders showing the figures "7," "1," and "1" through the openings in the front of the machine in Fig. 1 are the time-indicating cylinders 318 319 320, Fig. 30. These cylinders are held to turn on their collars on the shaft 47. In Fig. 30 is shown an electromagnet 321, by the action of which said time-indicating cylinders are rotated. The yoke 322 of this electromagnet is secured to a bracket or casting 323, which is in turn secured to the frame R. The cylinder 320, secured to a collar 325, is turned upon the shaft 47 at certain time intervals by the action of the electromagnet on a ratchet-wheel 326, which is also secured to the collar 325.

Fig. 31 shows the front of the electromagnet, which is of the type of double coil and plungers. The coils extend around the magnet-cores 327 of a length sufficient to bring the ends of the plungers 328 in a position so as to form a bridge for the lines of magnetic force. The movement of the plungers is guided by pins 329, preferably of brass, centrally located in the plungers and extending into apertures 330 in the cores 327. Said apertures are of a diameter sufficiently large to allow free play of the pins 329 therein.

To the center of the yoke 331 of the plungers is secured a brass rod 332, which passes through and is guided by a boss 333, secured to the yoke 322. A collar 334, provided with a set-screw, forms means for adjusting the tension of a coil-spring 335, positioned upon the brass rod 332, and between said collar and the boss. The action of this coil-spring 335 is to push or lift the plungers and hold same in their normal position. The range of motion of the plungers is regulated by a collar 336, located upon the lower end of the rod 332.

The parts spoken of as "brass" may be of any other suitable non-magnetic material in order to prevent short magnetic circuit.

A collar 337, loosely mounted upon a spindle 47, is provided with an arm 338, upon the end of which is a spring-actuated pawl 339, which is adapted to engage with the teeth of the ratchet-wheel 326. (See Fig. 32.) The arm 338 is connected to the yoke of the plungers by means of a lever or connecting-rod 341. By each motion of the plungers the ratchet-wheel is turned forward a distance of one tooth and is prevented from being turned in a reverse direction by a spring-actuated pawl 342, located upon a spindle 343. In a like manner the pawls for the remaining cylinders are mounted upon the shaft 343 and the springs on a shaft 344, said shafts being journaled in arms 345, extending from the shaft 47. To the end of the collar 325 is secured an eccentric-wheel 346, which, together with the cylinder 320 and ratchet-wheel 326, rotate together. On the eccentric-wheel 346 are formed two eccentrics 347 and 348.

Fig. 42 shows a plate 340, adapted to slide between the eccentric-wheel 346 of the cylinder 320 and a ratchet-wheel 349 of the cylinder 319. This plate is provided with slots 350 and 351, through which pass the spindles 47 and 343. A lug or pin 352 is mounted upon the face of this plate and is adapted to extend over the face of the eccentric-wheel 346. A spring-actuated pawl 353, secured to the face of this plate, is adapted to engage with the ratchet-wheel 349 of the cylinder 319. By turning the cylinder 320 one-half a revolution the plate 340 is raised on the eccentric-wheel 346 until it passes one of the points 347 or 348, when said plate will drop and the pin 352 will rest on the lowest point of the periphery of the eccentric-wheel, this movement of the plate 340 being insured by the tension-spring 354, one end of which is attached to the plate and the other end to the shaft 344. The length of the offsets 347 and 348 correspond with the distance from one tooth to another on the ratchet-wheel 349 of the cylinder 319. The face of the cylinder 320 is divided into twenty equal divisions and the ratchet-wheel 326 is provided with a like number of teeth. These divisions on the cylinder 320 are provided with indicating-numerals from "0" to "9."

By closing the electric circuit through the electromagnet the cylinder will be so turned as to display one of the successive indicating-numbers. At the same time the plate 340 drops, the pawl 353 engages the teeth of the ratchet-wheel 349 on the cylinder 319 and causes same to be moved one notch forward. A lug 355 on the face of the plate 340 engages against the face of the ratchet-wheel 349 and prevents same from being turned too far. The collar 356, ratchet-wheel 349, the cylinder 319, and the eccentric-wheel 357 form one body and are all simultaneously operated. The cylinder 319 has on its face eighteen divisions, and its ratchet-wheel a corresponding number of teeth, the eccentric-wheel 357 having three offsets, as shown in Fig. 41, the depth of which corresponds with the distance from one tooth to another on the ratchet-wheel 358, said ratchet-wheel being secured to the collar 359 of the cylinder 318.

The numbers on the cylinder 319 run successively from "0" to "5." Between the cylinders 318 and 319 and operating similarly to the plate 340 is a plate 360, the ratchet-wheel 358 having twelve teeth and the cylinder 318 a like number of divisions and indicating-numbers running successively from "1" to "12."

The collar 359, ratchet-wheel 358, and the cylinder 318 form one body and are adapted to operate simultaneously.

The cylinder 319 is turned one notch forward, the plate 360 drops, and its pawl engages with the teeth of the ratchet-wheel 358, the cylinder 318 being turned one division forward. The spring operating the plate 340 is of twice the tension or strength of the spring operating the plate 360.

An electric current is passed through the coils of the electromagnet once a minute for a small fraction of a second by means of a novel circuit-closing device adapted to be attached to any timepiece, and which will now be described.

In Fig. 30 the numeral "11" on the cylinder 318 designates the hour, the numeral "5" on the cylinder 319 the tens of minutes, and the numeral "9" on the cylinder 320 the units of minutes. The next action of the electromagnet will turn the cylinder 320 one division and bring the figure "0" into the position occupied by the numeral "9." By so doing the plate 340 is dropped, its pawl 352 turns the cylinder 319 one division forward, thus bringing the figure "0" into the place now occupied by the numeral "5." The eccentric-wheel on the cylinder 319 allows the plate 360 to drop, which by its pawl turns the cylinder 318 one division forward, bringing the numeral "12" into the place now occupied by the numeral "11." Each motion of the plungers 328, operating within the electromagnet, turns the cylinder 320 one division. When said cylinder has made one-half revolution, the cylinder 319 is turned one division. When the cylinder 319 is turned one-third revolution, the cylinder 318 is turned one division.

Referring now to Fig. 39, the numeral 361 indicates the frame of a common clock, having attached thereto the automatic circuit-closing device before referred to. Said clock may be placed inside the register or at any desired distance. A ratchet-wheel 362, having provided sixty teeth upon its periphery, is secured to a spindle 363, which is the spindle of the minute-hand of the timepiece. This ratchet-wheel 362 may be secured to said spindle either in front of the frame or on an extension of said spindle in the rear of the frame. A reciprocating arm or lever 364 is pivoted to the frame, and has an upwardly-extending portion 365, adapted to engage with the teeth of the ratchet-wheel. It is normally held in position by a coil-spring 366, one end of which is attached to a downwardly-extending arm 367 of the reciprocating lever 364, the other end of which is attached to a threaded pin 368, which is held in position by a lug or boss 369 and having on its outer end a thumb-nut 370. By this thumb-nut 370 operating upon the threaded pin 368 the tension of the spring 366 is regulated. The long end 371 of the lever 364 has pivotally attached thereto a spring-actuated pawl 372, adapted to engage with the teeth of a ratchet-wheel 373, said ratchet-wheel being journaled to the face of the frame 361. The free end of the journal 374, on which the ratchet-wheel 373 is positioned, provides a terminus for one of the electric-circuit wires 375, the same being securely held in position by means of a washer 376. A spring-actuated pawl 377 is pivotally secured to the frame and is adapted to engage the teeth of the ratchet-wheel 373 and prevent the same from being turned in a reverse direction by the upward movement of the pawl 372. A plate 378, having its forward end bent outwardly to form the flange 379, has attached thereto the end of the wire 380. The upper end of this flange 379 is adapted to contact with the end of the teeth of the ratchet-wheel 373 as said wheel passes over said flange. By so doing the electric circuit is closed between the electromagnet of the time-indicator, the generator, (not shown,) and the timepiece. This plate 378 is electrically insulated from the main frame 361.

The automatic time-printer will now be described.

In Fig. 30 the time-printing type-wheels are shown so as to bring their type on the printing-line in common with the others. The mechanism of this time-printer is almost identical with that of the date-printer. To the bracket 323 is journaled a spindle 381, upon which spindle is mounted the cylindrical type-wheel 382, the face of which is provided with sixty printing-type representing minutes. To the collar 383 of said type-wheel is secured a ratchet-wheel 384, which has sixty ratchet-teeth on its periphery. A pawl 385 engages with the teeth of this ratchet-wheel, the working of which is identically the same as that of the automatic date-printer previously described. A small cylindrical wheel 386 is mounted upon a spindle 387, said spindle being journaled in the bracket 323. The face of this small wheel is provided with twelve printing-type representing hours. The sliding plate 388 forms the connection between the cylindrical wheel 382 and the smaller wheel 386. The spindle 381 extends through the frame 323 and has loosely mounted upon its outer end a collar 389, which is provided with an arm 390. A rod 391, securely held to the end of this arm, extends over the face of the printing-wheel 382. The spring-actuated pawl 385, previously mentioned, is mounted upon this rod 391 and engages with the teeth of the ratchet-wheel 384. A lever 392 connects the end of the rod 391 with the lower end of the rod 332. The lower end of this lever 392 is slotted and adapted to receive the rod 391. By the action of the electromagnet the time-indicating cylinder 320 is turned forward, and at the same time the rod 332 turns the minute type-wheel 382 forward. The proper range of motion for the minute-wheel is obtained by the proportionate length of a slot in the lower end of the connecting-bar 392.

The machine so far described constitutes the cash register and indicator, the printing of cash transactions, the detail printer, automatic date-printer, and the electromechanical time indicator and printer.

The detail autographic register and recorder will now be described.

It is our intention to construct an autographic register and recorder which is mechanically connected to the above-described cash-register and operated in connection with the same and can also be used to advantage when disconnected from the register.

The autographic register and recorder consists of a rectangular casing containing a number of independent continuous strips of paper for the purpose of recording business transactions of different nature on different paper strips, which are distinguished from one another by being of different colors or having different-colored ruling thereon. The principal entries are classified as follows: "Charge," "Received on account," "Paid out on account," and "Merchandise received." In transferring the entries from the paper strips of the autographic register to the books mistakes are avoided, as all items on one strip are entered in the same book.

In Figs. 15, 16, and 17 the form of the register is shown, it being constructed of the side frames 393, end frames 394, and cross-frames 395, which form spaces 396 and in which the spindles of the paper-rolls and other working parts are placed. Fig. 15 is a top plan view and shows openings 397 in the front cover where the entries are made on the paper strips. Suitable lettering is provided on the face of the cover to signify the nature of the different entries at each opening. A corresponding number of openings 398 are provided in the rear end cover, which openings are protected by transparent plates 399, through which a portion of the entries upon the paper strips are visible. In the longitudinal sectional view of Fig. 17 are shown four series of rollers 400, said rollers being composed of rubber or analogous material, mounted upon the spindles 401 and 402, which in turn are journaled in the side frames 393. These rollers are provided with meshing gear-wheels 403 adjacent their right ends. A lever 404 is secured by a collar 405 to the end of the spindle 401. This lever 404 is provided with a spring-actuated pawl 406, the point of which engages between the teeth of the upper gear-wheel 403. Said pawl is provided with a projecting arm 407, by which the pawl can be disengaged from the gear-wheel 403. The rubber rollers are turned in one direction only, this being done by manually operating the hand-lever 404. A pawl (not shown) pivotally mounted on the frame engages with the teeth of a ratchet-wheel, (not shown,) the same being secured to the collar of the lower gear-wheel 403. This pawl prevents the rubber rollers from being turned in a reverse direction. Drums 410, adapted to carry rolls of paper 411, are mounted upon a spindle 412 in the forward portion of the machine. The strips coming from these paper-rolls 411 pass over antifriction-rollers 413, over the transparent plates 414, between the rubber rollers 400, and from thence out through openings 415, provided in the casing immediately in the rear of the rubber rollers. The transparent plates 414 are held in position by recesses 416 in the sides of the frames 395. A second series of drums 417 are mounted upon a spindle 418 immediately in the rear of the series of drums 410. These drums 417 carry rolls of paper 419. To the loose end of a cover 420 are hinged semicylindrical covers 421, the object of which is to protect the rubber rollers and their adjacent mechanism. The forward ends of these semicylindrical covers 421 are bent so as to form flanges 422. An angle-bar 423 extends across the intersecting frames 395, is secured to them, and forms a rest for the forward end of the rear cover 424, said rear cover 424 having therein the apertures 398 and is hinged to the rear frame 394. Transparent plates 425 are secured to this rear cover 424 and are adapted to close the openings 398. Suitable supports 426 are secured to the intersecting frames 395 immediately below the transparent plates 425. Paper strips 427 pass from the rolls 419, over the antifriction-rollers 413, between the rubber rollers 400, from thence beneath the angle-bar 423 onto the supporting-strips 426 and to the rear interior of the recorder. On the lower face of the forward end of the cover 420 is secured a rubber stamp or electrotype 428. A spindle 429 is journaled in the intersecting frames 395 and has attached to it a collar 430, to which is secured an arm 431. On the end of this arm 431 is secured a plate 432, the face of which is provided with a sheet of soft rubber, felt, or like material 433. To the right end of said spindle is secured by a collar 434 an arm 435, the lower end of which is pivoted to a bar 436. Said bar extends forward through the front of the casing and is there provided with a knob 437. On the outside of the left end frame are secured two brackets 438 439. Journaled in said brackets are spindles 440 and 441, motion being imparted from the spindle 441 to the spindle 440 by means of the rubber-faced friction-rollers 442, which are held in position on the spindles by means of washers 443. On the outside of the rubber roller 442 on the spindle 441 is secured a gear-wheel or pinion 444. A pawl 445, pivoted to the bracket 438, engages with the teeth of said gear-wheel. The downwardly-pending arm of said pawl extends through the cover 445, said cover being attached to the said casing 393. The spindles 440 441 extend through said cover and have attached upon their ends knobs 447 448.

A ribbon 449 is wound upon the spindle 440, the end carried around antifriction-rollers 450 and 451 and back around the spindle 441, to which it is attached. By turning the spindle 441 the ribbon is wound from said spindle to the spindle 440. By turning the spindle 440 the ribbon can be rewound upon the spindle 441, but this must be done while the pawl 445 is disengaged from the pinion 444. Upon the extreme right end of the spindle 402, within the casing 446, is located a disk 466, said disk being provided with an eccentric flange 467 upon its face, said eccentric flange meshing with the teeth of the pinion 444. Thus as the spindle 402 is rotated the ribbon 449 will be rotated.

The rubber stamp or electrotype 428 may be placed upon the plate 432 and the soft-rubber strap placed upon the plate 420. Thus the printing will be effected upon the back of the continuous strip 427. The object of this device is in the printing of bill-headings upon statements issued to customers or when paper is used with printed headings it can be used as a receipt-stamp. It may be used in any or all of the sections. This printing may also be accomplished on either side of the paper strips and the matter printed be changed as often as desired.

The operation of the machine is as follows: The transaction is entered upon the proper paper slip, and if said transaction be either a "Charge" or "Received on account" a statement or receipt is issued, in which case one or more copies of the transaction entered is made by the use of carbon-paper. The paper strip or strips are delivered by operating the lever 404 until the last line of writing appears in the opening 415. Then the cover 421 is pressed down, thereby causing the edge 422 to contact with the angle-bar 423. This forms an edge whereby the discharged paper can be easily and smoothly torn from the strip.

If the printer is used for printing bill-headings, the knob 437 is pushed in before the next entry is made. If it is used as a receipt or advertising stamp, the printing may be done at any point along the strip. Said paper strips are removed from the chambers by lifting the rear cover 424, which is hinged to the rear frame 394.

When the autographic register and recorder is used in connection with the cash-register, the connection of the two is made as follows: In Fig. 43 is shown a horizontal sectional view of the connections between the cash-register and the autographic register. In making this connection four spindles $452^a$, $452^b$, $452^c$, and $452^d$ are employed in the cash-register to correspond with the keys "Charge," "Received on account," "Paid out on account," and "Merchandise received." These spindles are journaled in the frame L and in the bracket 452, which is mounted upon the angle-bars 6 and 9. Each of these spindles is provided with a collar 453, the projecting arm of which is connected with the reciprocating arm 257 by means of the rods 455. Each of these spindles extends through the frame L and has a disk 456 fixed to its outer end, and each of said disks has a notch 457, adapted to receive the projecting arms or lugs 458, fixed to the disks 459, which disks 459 are secured to the ends of the spindles $460^c$, $460^r$, $460^p$, and $460^m$, extending from the side of the autographic register and recorder. An enlarged detail view of the connection between said disks is shown in Fig. 24. There are four of the rods 455, and the one which operates the spindle $460^c$ is connected to the "Charge" key, the one which operates the spindle $460^r$ is connected to the "Received-on-account" key, the one which operates the spindle $460^p$ is connected to the "Paid-on-account" key, and the one which operates the spindle $460^m$ is connected to the "Merchandise-received" key. In the sectional elevation shown in Fig. 4 but one of the rods 455 is shown owing to the line upon which said section is taken. In Fig. 43 said bars 455 are shown in horizontal section, and in Fig. 44 one of said bars 455, together with its connections, is shown in detail. The spindle $460^c$ extends into the compartment W of the autographic register and is provided at its end with a downwardly-pending arm 461, the lower end of which is connected to the downwardly-pending arm 435 by means of the bar 436. If the key marked "Charge," Fig. 1, is operated, the bar 455 is operated to rotate the shaft $452^a$, thereby rotating the shaft $460^c$ and reciprocating the arm 436, thus raising the rubber plate 433 against the type, and the printing is effected. (See Fig. 16.) The spindle $460^r$ extends into the compartment X of the autographic register and is provided with the upwardly-extending arm 462, the upper end of which is pivotally connected to the ratchet-rack 463, the forward end of which engages the ratchet-wheel 409. Said rack is held in position by a spring 464. The bracket 465 forms a guide for the ratchet-rack 463 during its forward movement. The spindle $460^p$ extends into the compartment Y of the autographic register, and the spindle $460^m$ extends into the compartment Z of the autographic register. (See Fig. 43.)

If the key marked "Received on account," Fig. 1, is pressed in, its corresponding adding-wheel is acted upon, the spindle $460^r$ is slightly rotated, and the paper strips are moved forward as desired. The ratchet-rack returns to its normal position, following, of course, the movement of the arm 462 on the shaft $460^r$.

In recording fractions of a dollar in addition to any amount from one dollar upward the combination sales-key is pressed and held down while the proper keys are pushed in in succession.

In recording amounts composed of one figure and the rest ciphers the combination sales-key need not be used. The combination sales-key acts on the indicating-cylinders and has no effect upon the adding-wheels. The combination sales-key is used in the same manner whether the printer is or is not set.

The printing-lever must be pressed to its extreme lowest point; otherwise it could not return and the keys would remain locked.

Transactions such as "Charge," "Received on account," "Paid out on account," "Merchandise received," &c., are first entered on the proper paper slips and the corresponding detail-key pressed in, which adds the number of the transactions consecutively on the corresponding adding-wheels.

What we claim is—

1. In a machine of the class described, the combination of a series of keys, rotating indicating-cylinders, a series of vertically-reciprocating tubes, angle-bars secured to the frames of the machine and provided with bearings in which said tubes are mounted to slide, arms or bars attached to said tubes and extending rearwardly, bearings in said arms, a second series of tubes engaging in said bearings, ratchet-racks mounted upon said second series of tubes, auxiliary tubes provided with forwardly-extending arms, and racks mounted upon said arms and engaging with pinions connected to the said rotating indicating-cylinders.

2. The combination, in a machine of the class described, of a series of laterally-moving keys adapted to be pushed inwardly to operate the various devices within the machine and having teeth on their upper edges, pinions meshing with said teeth, gear-wheels connected to move with said pinions, vertically-moving racks operated by the said gear-wheels, adding mechanism, pinions meshing with said vertically-moving racks and adapted to operate said adding mechanism, and spring-pressed frames arranged to engage the inner ends of said keys and return the latter to their normal position, substantially as herein specified.

3. In a machine of the class described, a cash-receptacle, a laterally-moving plate normally covering said receptacle and provided with downwardly-pending flanges, rollers fitted to said flanges and operating in rearwardly-inclined tracks, a spring-actuated laterally-moving bolt provided with a head for operating the plate, or cover, a vertically-moving bolt engaging in a notch in the said plate, and mechanism for operating said vertically-moving locking-bolt.

4. In a machine of the class described, a series of laterally-moving plates, a portion of the upper edges of which are raised, a vertically-reciprocating bar provided with a series of oscillating dogs adapted to be engaged by the raised portion of the plates, a bell-crank lever, and an arm adapted to rotate a shaft carrying a series of pawls, said bell-crank and arm being operated by the vertically-reciprocating bar.

5. The combination of a series of keys, a framework, indicating mechanism, the bar 70 and operating mechanism therefor, connections between said bar and said series of keys and said indicating mechanism, a slotted plate pivoted to the framework and provided with a beveled face adapted to engage against and move laterally a bell-crank, and means for operating said plate, substantially as herein specified.

6. In a machine of the class described, the combination of a series of keys, a frame, indicating mechanism, a special sales-key, comprising a spring-actuated key, a laterally-moving plate, a bell-crank adapted to be engaged by said plate, a vertical rod secured to one arm of said bell-crank and an oscillating plate connected to said vertical rod, said plate operating said indicating mechanism, substantially as shown and specified.

7. In a machine of the class described, an electromagnet comprising a suitable yoke, the cores of the magnets provided with apertures, plungers provided with pins adapted to engage said apertures in the magnet-cores, and a spring-actuated rod connected to said plungers and passing through the yoke of said electromagnet.

8. In a machine of the class described, an automatic electric-circuit-closing device, comprising a toothed wheel, a spring-actuated pawl engaging the teeth of said wheel, an auxiliary pawl pivoted to one end of said spring-actuated pawl, a toothed wheel located adjacent to, and engaged by, said auxiliary pawl, the shaft of which forms a terminus for one of the electric conductors, and a plate having formed integral therewith a spring-flange adapted to engage with the teeth of said toothed wheel, said plate forming a terminal for one of the electric conductors.

9. In a machine of the class described, a date-printing device, comprising two rotating cylindrical printing-wheels having rubber-faced printing-type on their peripheries, their edges being formed into teeth, spring-actuated pawls adapted to engage between said teeth, cam-wheels mounted upon the shaft of said printing-wheels, a plate carrying spring-actuated pawls adapted to be raised and moved by said cam-wheels, and mechanism for automatically operating said date-printing wheels.

10. In a machine of the class described, an autographic register and recorder, comprising a rectangular framework divided into a series of compartments, continuous paper-rolls located within said compartments, means for automatically discharging and unwinding said rolls of paper, and means for printing upon one of said rolls of paper, said means comprising a lever manually operated and a printing-face located immediately below the paper that is being discharged.

11. In a machine of the class described, a ribbon-moving device, comprising a plurality of rollers upon which said ribbon is wound, a pinion mounted upon one of said rollers, and a disk mounted upon a shaft, said disk being provided with a semicircular eccentric flange upon its face, said eccentric flange arranged to engage the teeth of the pinion.

12. In a machine of the class described, the combination of a cash register and indicator and an autographic register and recorder divided into compartments, rolls of paper located within said compartments and passing between rollers, a printing-plate located adjacent said rollers, together with mechanism operating said rollers and said printing-plate, said operating mechanism being connected to the operating mechanism of the cash register and indicator.

13. In a machine of the class described, the combination of the following elements: a plurality of series of keys, spring-actuated frames adapted to normally engage against and return said keys to their proper position, pawl-operating mechanism connected to said keys, key locking and unlocking mechanism, a special-sales-key mechanism, a bolt-withdrawing mechanism, a plate-withdrawing mechanism, detail-printing mechanism, date and time printing mechanism, the electro-mechanical time indicator and printer, the combined autographic register and recorder, and connections between the said elements, substantially as shown and specified.

In testimony whereof we affix our signatures in presence of two witnesses.

ROBERT BAUMANN.
THEODORE H. WURMB.

Witnesses:
M. G. ORION,
JNO. C. HIGDON.